US009525711B2

(12) United States Patent
Ackerman et al.

(10) Patent No.: US 9,525,711 B2
(45) Date of Patent: Dec. 20, 2016

(54) MULTI-MEDIA CONFERENCING SYSTEM

(71) Applicants: Ginger Ackerman, Gainesville, GA (US); Josette Fleszar, Gainesville, GA (US)

(72) Inventors: Ginger Ackerman, Gainesville, GA (US); Josette Fleszar, Gainesville, GA (US)

(73) Assignee: Jigsaw Meeting, LLC, Gainesville, GA (US)

( * ) Notice: Subject to any disclaimer, the term of this patent is extended or adjusted under 35 U.S.C. 154(b) by 379 days.

(21) Appl. No.: 14/465,981

(22) Filed: Aug. 22, 2014

(65) Prior Publication Data

US 2014/0362165 A1 Dec. 11, 2014

Related U.S. Application Data

(63) Continuation-in-part of application No. 12/538,276, filed on Aug. 10, 2009, now abandoned.

(60) Provisional application No. 61/087,225, filed on Aug. 8, 2008.

(51) Int. Cl.
*G06F 3/048* (2013.01)
*H04L 29/06* (2006.01)
*H04N 7/15* (2006.01)
*G06Q 10/10* (2012.01)

(52) U.S. Cl.
CPC ........... *H04L 65/4023* (2013.01); *G06Q 10/10* (2013.01); *H04L 65/4015* (2013.01); *H04L 65/4046* (2013.01); *H04L 65/4076* (2013.01); *H04L 67/38* (2013.01); *H04N 7/152* (2013.01); *H04N 7/155* (2013.01)

(58) Field of Classification Search
CPC ............ G06F 17/30056; H04L 65/403; H04L 12/1813
USPC .......................... 715/730, 750, 753; 709/204
See application file for complete search history.

(56) References Cited

U.S. PATENT DOCUMENTS

2004/0002049 A1* 1/2004 Beavers ................... G09B 5/00
434/350
2008/0005244 A1* 1/2008 Vernon .................. G06Q 10/10
709/204

* cited by examiner

*Primary Examiner* — Ajay Bhatia
*Assistant Examiner* — Phuong Nguyen
(74) *Attorney, Agent, or Firm* — Bryan W. Bockhop; Bockhop Intellectual Property Law, LLC

(57) ABSTRACT

A multi-media conferencing system that integrates visual, audio, independent data interaction and modification, collaboration of information, independent video and 3D model viewing and manipulation, and networking among all participants in the meeting. Each participant conference display typically shows two content sectors under the control of the presenter and a selectable number of other content sectors under the control of the participant. The presenter conference display selectively includes a presenter dashboard for managing the presentation. Each content sector on the participant and attendee conference displays may be enlarged to full screen or reduced to a sector display or an icon with a simple command. The system also includes geo-location display functionality, participant monitoring, attendee chat functionality, and a wide range of additional functionality under the control of the conference presenter and attendees.

20 Claims, 15 Drawing Sheets

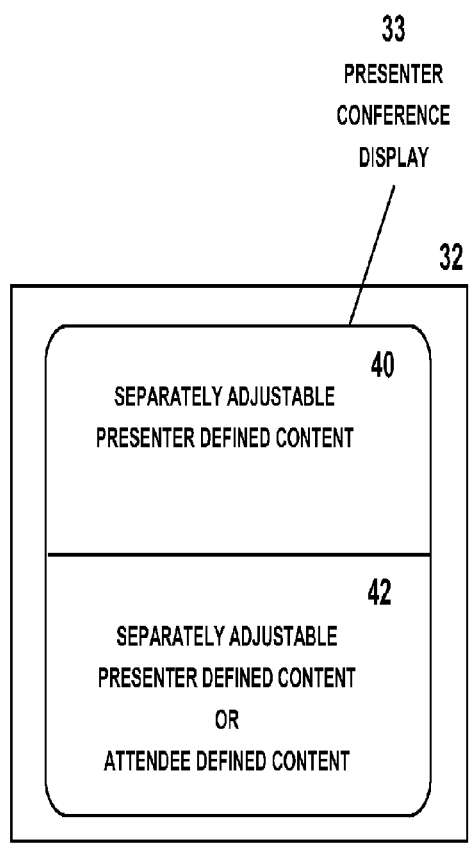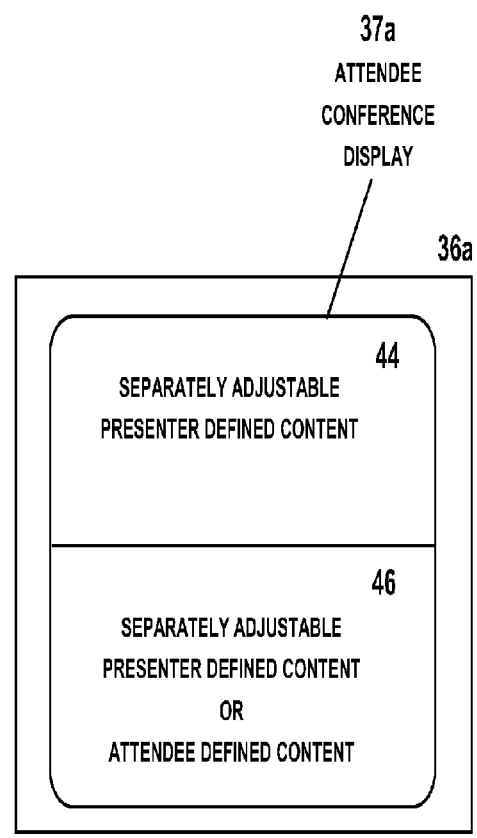
FIG. 3A
FIG. 3B

MULTI-MEDIA CONFERENCING SYSTEM

CROSS-REFERENCE TO RELATED APPLICATION(S)

This application claims the benefit of U.S. Provisional Patent Application Ser. No. 61/087,225, filed Aug. 8, 2008, the entirety of which is hereby incorporated herein by reference.

This application is a continuation-in-part of, and claims the benefit of, U.S. patent application Ser. No. 12/538,276, filed Aug. 10, 2009, the entirety of which is hereby incorporated herein by reference.

BACKGROUND OF THE INVENTION

1. Field of the Invention

The present invention relates to multi-media conferencing systems and, more particularly, a multi-media conferencing system with individually controllable display sectors, geo-location display functionality, participant monitoring, attendee chat functionality, and a wide range of additional functionality under the control of the conference presenter and attendees.

2. Description of the Related Art

Today's sales, marketing, education, training and overall corporate meetings require a significant amount of travel to meet face to face with the necessary participants of these meetings. With travel costs skyrocketing, corporate budgets decreasing and the need for companies to demand more production and efficiencies from their staff the need for a new way of meeting has come to the forefront. The traditional web-based conference calls and meetings are not viable resolutions to these needs. With today's economy, the need to do more with less, reduce costs but improve results is paramount. Companies spend millions of dollars in travel costs to get their executives, salespeople, product installation and training teams, managers and directors to meetings with customers or internal training, education and strategy sessions. The need for this face-to-face connection is of paramount importance for many companies.

While there are options for connecting with customers and others besides the face-to-face meeting, the fact that other means of communications fall short of the face-to-face connection continues to force companies to use physical travel as the primary means for meetings, training, educational and strategy sessions. This is driven by the inability of current computer-based web conferencing systems to give the same personal interaction through seeing the participating parties, recognizing that their body language does not match their verbal communications, that multiple participants cannot be actively and physically viewable and verbal, and the loss of the critical personal touch of interaction between all parties. The ability to share data interactively, collaborate and manage document changes are also lacking in today's web conferencing products.

The average cost of a two-day business trip without entertainment can range from $750 to $1,100 per day, per person. This includes airfare, hotel and a meal per diem. Other cash costs associated with the actual event of travel is parking fees, rental cars, fuel and tips. Non-cash costs for a business trip includes nonproductive time going to and from the airport, waiting for the flight to board, flight delays, lost opportunity to attend other meetings during that two-day timeframe, catch up time after the trip along with the critical cost of being away from family.

Today conference calls, web-based conferences and video conferencing are being utilized. Conference calls allow the presenter to speak to with all participants utilizing a dial in number and most participants can verbally respond. However, true interactivity is lost, while individuals in the audience can become lost in the presentation material because the group often does not have effective visualization or other information to help them follow along other than what the speaker is imparting.

Computer-based web conferencing systems are able to provide limited levels of visual and verbal content but they utilize two media components, the web and a telephone line. They also have significant limitations in the number of participants who can join the conference due to bandwidth issues. With computer-based web conferencing, the participants can see the presentation and in some cases the presenter, but their ability to interact real time with other participants and independently with the data is severely limited. With the limited access to true interaction come severe restrictions on the ability to interact with both data and participants at the same time from an independent perspective.

For example, there is typically no way to determine whether participants actually leave the meeting once they sign in or if they are working on other items instead of participating in the session because these options are basically a one way communication. The newer versions of computer-based web conferencing allow some interaction but they are limited in the ability for the presenter to share interactive documents and for participants to interact with the presenter and other participants.

Other areas where traditional computer-based web conferencing or conference calls fall short is the ability to communicate with the presenter with immediate feedback that allows for modification in speed or content of the presentation during the session. Without this particular option, there may be no way to ensure that the learning experience provided by the meeting is a positive one of that the presentation content and positioning are being fully understood by the attendees.

With conventional conferencing systems, it may also be difficult to know exactly who is on the call/session since there is usually no mechanism providing identification of the participants. Most computer-based web conferencing programs provide a list of attendees that is generally first name only. This basic list does not allow other participants and the presenter to know anything more about the audience that enables tailoring of the presentation, etc.

Video conferencing allows people to see and hear each other, but it requires a huge initial investment in video and monitoring equipment for any party wanting to participate in the conference. Then there is the expensive per-minute charge to transmit the conference utilizing the satellite system and the need to transport people to the video conference area still demands travel costs are incurred. The current overall experience of conference calls and computer-based web conferencing is a one-way communication channel that, while oftentimes mandated by the circumstances, leaves the audience and the presenter with a sense of boredom and a "why bother" attitude. There is, therefore, a continuing need for improved electronic conferencing systems.

SUMMARY OF THE INVENTION

The present invention meets the needs described above in a multi-media conferencing system that brings virtual reality to the business world through unique technology that allows virtual face-to-face meetings of two or more individuals. Several types of parties that may be involved in a conference will be identified for descriptive convenience as meeting "participants," which include the "presenter" located at a presenter computer station and one or more "attendees," each located at an attendee computer station. The presenter computer stations shows a presenter conference display, whereas each attendee computer station shows an attendee conference display. The functionality of the presenter conference display is similar to but somewhat different form the attendee conference display. For example, the presenter has control over certain presenter-defined content, whereas the attendees are generally restricted to viewing and listening to the presenter-defined content, while they have control over certain attendee-defined content. The presenter conference display also has access to a "presenter dashboard" for managing the conference, which is typically not available on the attendee conference display.

While the role of presenter is typically assigned to one participant computer station at any particular point during a conference, different participants may be "passed the presenter's baton" during the course of a meeting. The meeting may also be set up and coordinated by a "host" who may or may not be a meeting participant. In addition, a corporate multi-media conferencing system may be used by multiple hosts and presenters involved in multiple conferences, which may be conducted at the same time or at different times, as desired. Of course, the same person may be a host in one meeting, a presenter in second meeting, and an attendee in a third meeting; and the roles of attendee and presenter may change during the course of a meeting as the presenter's baton is passed among the participants. The multi-media conferencing system may also implement a wide range of functionality to implement and enhance the virtual meeting experience. In fact, the multi-media conferencing system is in some ways better than an in-person meeting due to the power of the multi-media and networking features of the system.

The multi-media conferencing system integrates visual, audio, independent data interaction and modification, collaboration of information, independent video and 3D model viewing and manipulation, and networking among all participants in the meeting. Each participant conference display typically shows two content sectors under the control of the presenter and a selectable number of other content sectors under the control of the participant (i.e., presenter or attendee). The presenter conference display selectively includes a presenter dashboard for managing the presentation. Each content sector on the participant and attendee conference displays may be enlarged to full screen, reduced to a sector display, or minimized to an icon with a simple command. The system also includes geo-location display functionality, participant monitoring, attendee chat functionality, and a wide range of additional functionality under the control of the conference presenter and attendees.

Generally described, the invention may be implemented as a multi-media conferencing system for conducting electronic meetings for meeting participants that include at least one meeting presenter and at least one meeting attendee through a group of computer stations interconnected by a communication network. The system includes a presenter computer station configured to present a presenter conference display and at least one attendee computer station configured to present an attendee conference display. The presenter conference display includes a selectable number of presenter content sectors in which the display size of each presenter sector is separately adjustable. Each presenter sector is expandable to a full-screen view and retractable to a partial-screen view, or to an icon, through operation of a presenter user interface implemented by the presenter computer station. Similarly, the attendee conference display includes a selectable number of attendee content sectors in which the display size of each attendee sector is separately adjustable, and each attendee sector is expandable to a full-screen view and retractable to a partial-screen view, or to an icon, through operation of an attendee user interface implemented by the attendee computer station. In addition, the content of each presenter sector is controlled by the presenter computer station, whereas the content of the first and second attendee sectors (typically a video sector and a slide show sector) is controlled by the presenter computer station while the content of a third and potentially additional attendee sectors is controlled by the attendee computer station.

Although the content of the various sectors can be changed, in a preferred setup the first attendee sector (typically the upper left content sector) is configured to display a video presentation controlled by the presenter computer station, and the second attendee sector (typically the upper right content sector) is configured to display a slide presentation controlled by the presenter computer station. Although these two presenter-defined content sectors are normally controlled by the presenter, the presenter computer station may be operative to release control over the slide presentation to permit the attendee computer to view and re-view the content of the slide presentation. Without this release of control, the presenter is ordinarily allowed to review and modify the slide presentation during the course of the conference without obtaining a release of control from another conference participant.

The content in the video sector can be easily changed among video feed resources, which can be provisioned in advance or identified during the course of a presentation. In particular, the presenter computer station is typically operative to switch the video presentation between a live camera feed, such as a video feed of the room where the presenter is located, and a pre-recorded video feed, such as video file stored on the presenter's computer station containing substantive material for the conference. The presenter can also select live or pre-recorded video feeds from networked resources including attendee computer stations, which allows all of the meeting participants to display live video from their location or play pre-recorded video for the meeting participants, as desired, during the course of the meeting. The presenter computer station is also operative to record the video presentation, which may include various live and pre-recorded, local and networked video feeds from different locations that came online during the conference, and playback the recorded video presentation after conclusion of the meeting.

The multi-media conferencing system also allows the presenter and each attendee computer station to upload documents during the meeting, which can be selectively displayed only on the uploading computer station or on all participant computer stations. Once a document has been uploaded, the presenter and attendee computer stations are typically able to modify the document and share the modified document with the other meeting participants. Upload documents may include text files, images, graphic files, 3D renderings, CAD files, x-ray images, MRI images, spreadsheets and many other suitable files in a wide range of file formats supported by the system.

In addition, the participant computer station is configured to receive a presenter avatar having personal information relating to the presenter including the physical location of the participant computer station. The attendee computer station is also configured to receive an attendee avatar having personal information relating to the attendee including the physical location of the attendee computer station. Other information, such as a photo, biography, and other attachments (e.g., voice recording, art catalog, publication catalog, music recording, financial history, etc.) may also be included in the avatar. In general, the avatar may range from very basic information to a very sophisticated personal or professional profile, and may include any other compatible documentation that the disclosing participant wants to make available to the group, at the discretion of the participant submitting the avatar. The participant conference displays are configured to selectively show a map with location icons indicating the physical locations of the meeting participants on the map (i.e., geo-location function) and a participant list. When a conference system user brings the cursor over a participant's location identifier on the map or name on the participant list, the associated avatar posted by the selected participant is typically displayed in a pop-up window. The user may then select items made available through the avatar, such as photo, text or voice recording, as desired, to gain further information about the participant. Each meeting participant can individually select and review avatar information for other meeting participants without affecting the view of the conference experienced by other participants.

The multi-media conferencing system also implements a number of other helpful functions, such as text chat among meeting participants, personal noteboards and personal whiteboards for each participant, and group and personal whiteboards, with the ability to save the designated work to each participant computer through a "pdf" file or other suitable file format. The presenter conference display also implements a presenter dashboard, which typically includes a message pane operative to receive and display a feedback text message received from the attendee computer station, and a presentation management pane operative to control the content of the presenter controlled sector. The presenter dashboard may also include a presenter notes pane operative to receive and display text notes entered through the presenter computer station that are not shown on the attendee conference display.

The multi-media conferencing system may also be configured to enable multiple attendee computer stations to participate in the meeting. Each attendee computer station is configured to start, stop or replay the video presentation without affecting the display of the video presentation on other participant computer stations. The presenter conference display is also operative to selectively display a presenter noteboard for receiving and displaying text notes entered through the presenter computer station that are not displayed on the attendee conference display. Similarly, the attendee conference display is operative to selectively display an attendee noteboard for receiving and displaying text notes entered through the attendee computer station that are not displayed on the participant conference display. The presenter and attendee conference displays are also operative to selectively display personal and group whiteboards for receiving and displaying text notes and images.

A useful feature of the system is the "room check" function that allows the presenter computer station to send a "room check message" to the attendee station having a limited display time set by the presenter computer station. The attendee conference display is operative to display the room check message and receive an attendance response indicating the presence of the attendee at the meeting at the time of the room check message. The display of the room check message and the ability of the attendee to respond automatically expire at the conclusion of the limited display time set by the presenter computer station. To monitor meeting attendance, the presenter computer station typically records the attendance response and the attendee conference display may automatically terminate in response to a failure of the attendee to timely enter the attendance response.

Another useful feature is the "interactive feedback" function, which can be used for a number of different purposes ranging from gathering suggestions and program evaluations, conducting polls and surveys, and administrating quizzes and formal tests. In general, the conferencing system is configured to enable multiple attendee computer stations to participate in the meeting, and the presenter computer station is configured to an generate interactive feedback item, such as a poll, survey, test, quiz or evaluation, and to distribute the interactive feedback item to the attendee computer stations. The attendee computer stations are each configured to respond to the interactive feedback item and transmit the response to the presenter computer station, which is configured to display the individual responses, tabulate the responses, and a display graphical representation of the tabulated responses.

The multi-media conferencing system is also configured to be independently operated by multiple hosts associated with an owner or licensor of the conferencing. To help with monitoring and management of system usage, the conferencing system includes corporate reporting functionality operative for automatically gathering, storing and displaying conference system usage information including identification of the hosts conducting meetings using the conferencing system and the attendees of each meeting. The conferencing system also implements meeting reporting functionality operative for automatically gathering, storing and displaying meeting information including the identification of the presenter and attendees of each meeting, log-in and log-out information for each attendee, attachments downloaded by each attendee, attachments opened by each attendee, and feedback provided by each attendee.

In one aspect, the invention includes a multi-media conferencing system for conducting an electronic meeting for meeting participants including at least one meeting presenter and a plurality of attendees through a plurality of computer stations interconnected by a communication network. A conference server, coupled to the communication network and configured to receive from the presenter prior to the meeting a plurality of different conference material files, includes a plurality of different types of information resources. A presenter computer station, coupled to the conference server via the communication network, is configured to present a presenter conference display. A plurality of attendee computer stations, each coupled to the conference server via the communication network, is configured to present an attendee conference display. A reporting system is configured to maintain a record of the meeting, in which the record of the meeting includes: an identity of each meeting participant, a length of the meeting. A routine on the server is configured for presenting on a presenter display a map showing a physical location of each of the participants. A routine on the server is configured for receiving an indication from the presenter that allows the attendees to access at least one information resource during a presenter-defined portion of the meeting. A routine on the server is configured for presenting at least one quiz on each attendee conference display, receiving responses from each attendee to the quiz and displaying results of the quiz on the presenter display in real time. A routine on the server is configured for presenting on each attendee conference display an item requiring a response from the attendee within a predetermined time and disconnecting any attendee from the meeting who fails to generate the response within the predetermined time. Each attendee conference display includes at least a first presenter-controlled sector, a second presenter-controlled sector and an attendee-controlled sector. The first presenter-controlled sector and the second presenter-controlled sector of each of the plurality of attendee computer stations display a different set of information simultaneously under control of the presenter so that identical content is presented in each presenter-controlled sector of each of the plurality of attendee computer stations simultaneously. Each attendee computer station is configured to permit a corresponding attendee individually to select content in the attendee-controlled sector selected from a plurality of different content options selected from the plurality of different conference material files and to manipulate the selected content individually.

In another aspect, the invention is a method of conducting an electronic meeting for a plurality of meeting participants including at least one meeting presenter and a plurality of attendees through a plurality of computer stations interconnected by a communication network. A plurality of different conference material files, including a plurality of different types of information resources, prior to the electronic meeting, is uploaded to a conference server that is coupled to the communication network. An attendee conference display is displayed on each of a plurality of attendee computer stations so that each attendee conference display includes at least a first presenter-controlled sector and a second presenter-controlled sector. At least two different sets of information is displayed in two presenter-controlled sectors of each of a plurality of attendee computer stations simultaneously under control of the presenter so that identical content is presented in each presenter-controlled sector of each of the plurality of attendee computer stations simultaneously. Content selected by an attendee is displayed in an attendee-controlled sector of each of a plurality of attendee computer stations. Each attendee is permitted individually to select content in the attendee-controlled sector selected from a plurality of different content options and to manipulate the selected content individually, so that each attendee views content in the attendee-controlled sector independently of each other attendee. A map showing a physical location of each of the participants is presented on a presenter display. The meeting is recorded so as to record each of the information resources displayed during the meeting so as to allow play back of the meeting by one of the attendees after conclusion of the meeting. An indication is received from the presenter that allows the attendees to access at least one information resource during a presenter-defined portion of the meeting. At least one quiz is presented on each attendee conference display and responses are received from each attendee to the quiz and displaying results of the quiz on the presenter display in real time. An item requiring a response from the attendee within a predetermined time is presented on each attendee conference display. Any attendee who fails to generate the response within the predetermined time is disconnected from the meeting. A log indicating activity of each attendee, including when each attendee joined the meeting and when each attendee was disconnected from the meeting, is maintained.

The log records information including: the name of each of the attendees, how long they are in a meeting, how many times they leave the meeting, when they come & go, all activities done during the session, performance and test results both after the fact and in real time.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 3A is a high-level conceptual illustration of functionality available through a presenter conference display in the multi-media conference system.

FIG. 3B is a high-level conceptual illustration of functionality available through an attendee conference display in the multi-media conference system.

DETAILED DESCRIPTION OF THE INVENTION

Figure 1:
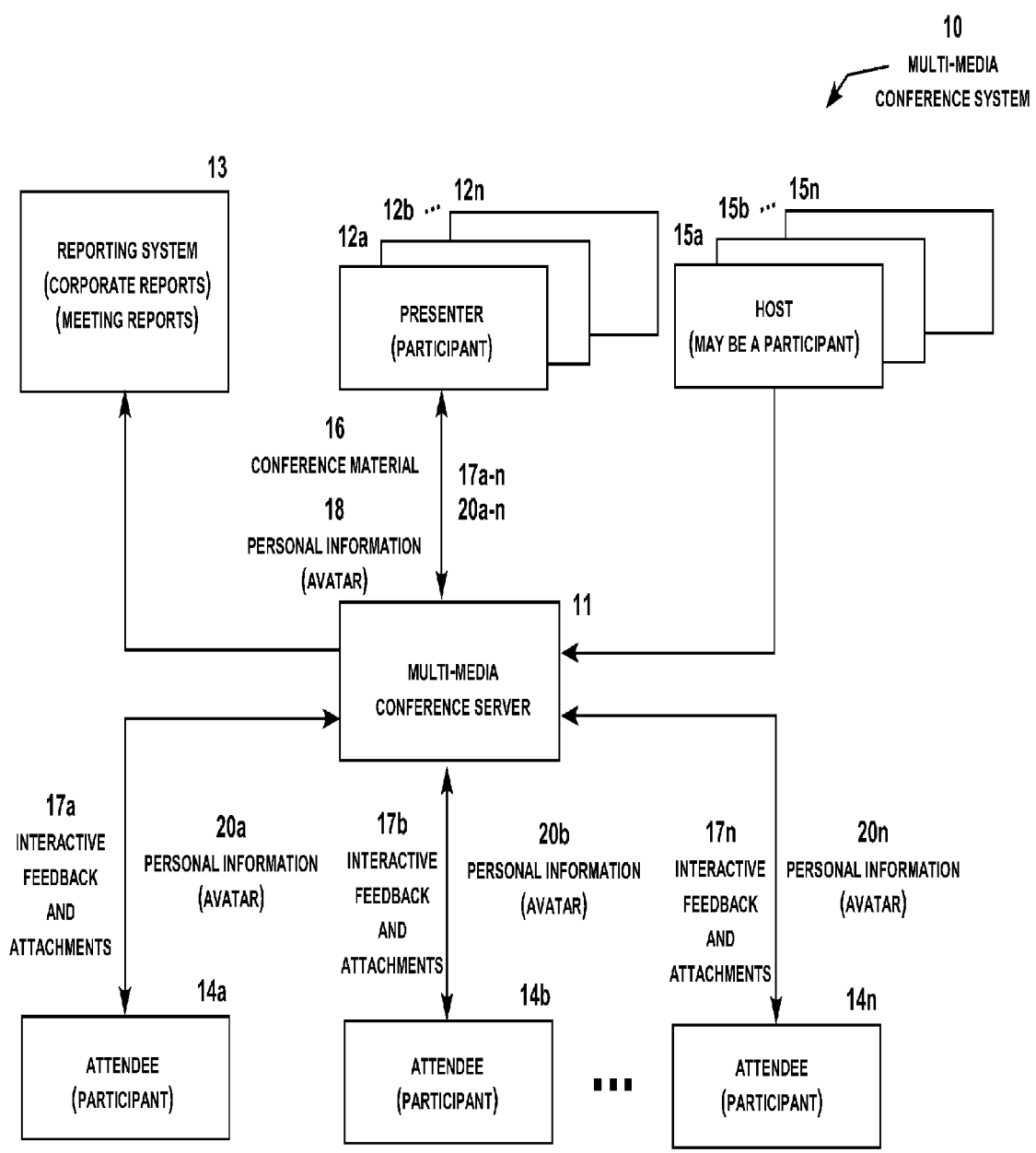
FIG. 1 is a is a functional block diagram of a multi-media conference system.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "global computer network" includes the Internet.

The multi-media conferencing system solves the problems with conventional conferencing systems and launches a new concept in the web conferencing market by bringing together many aspects of a face-to-face meeting, along with a rich compliment of multi-media features that are not typically available at face-to-face meetings, into the virtual world. The multi-media conferencing system integrates visual, audio, independent data interaction and modification, collaboration of information, independent video and 3D model viewing and manipulation, and networking among all participants in the meeting. The application also allows for multi-tasking during the course of the meeting by splitting the conference display into multiple sectors for optimizing the ability to engage, participate and learn during the meeting. An attendee conference display typically shows two content sectors under the control of the presenter and a selectable number of other content sectors under the attendee's control. The presenter conference display may also include a presenter dashboard for managing the presentation. Each content sector on the participant and attendee conference displays may be maximized to full screen, reduced to a partial-screen sector view, or minimized to an icon with a simple mouse click or other user command. The system also includes geo-location display functionality, participant monitoring, attendee chat functionality, and a wide range of additional functionality under the control of the conference presenter and attendees.

The multi-media conferencing system provides tools to allow a truly interactive real-time virtual experience. The system is designed to have multiple sectors on the computer screen that is interchangeable based on what the participant(s) need/want to do. The system includes the ability to watch the presenter, see the presentation and individually manipulate the data that has been made available so you review/learn at your pace. The presenter has control over certain aspects of the meeting such as allowing for independent manipulation and review of any presentations. Through the click of a button, the presenter can make this information available to the attendees that allow each attendee to independently move forward and backward in the presentation being reviewed in the meeting.

The video feature within the application allows the active presenter (or presenters) to be viewed by all meeting participants (presenter and attendees) during the meeting. The host of the meeting can determine how many active videos will be used for the meeting and chooses which presenters will be activated. Each presenter can record their portion of the meeting by clicking on the record button. Once the presenter completes the current portion of the presentation and passes the "baton" on to the next presenter, that presenter can also click the record button and the application will append the files together. At the end of the meeting, the system will automatically upload the file for viewing, provided that host leaves the meeting open for invitees to re-visit.

The multi-media conferencing system also includes the ability to upload all types of documents for presentations and reviews, such as PowerPoint, Word, Excel, "pdf" and image files. The individual participants can also manipulate the data from the file that is being reviewed. For example, if an Excel spreadsheet is being reviewed, the presenter can be explaining the numbers in the spreadsheet while another participant is using that data to build charts, graphs or pivot tables. The participant can also manipulate the data by changing numbers and assumptions or edit the text in a document. The ability to manipulate the data does not impact the original document or the file that the presenter is using, but the participants can save the changes to their computer for future reference and use.

The architecture of the system allows a selective number of presentation windows (also called sectors) to be displayed simultaneously, as desired, in an environment which allows each attendee to maximize or minimize any of the presentation windows. The system also allows either the presenter and/or the individual attendees to manipulate the collateral presentation material in real-time. The size of a sector can selectively be maximized to full screen, set to partial-screen with some other active sectors in the conference display, or minimized to an icon. Each participant can control the size of the each sector on his or her individual conference display without affecting the display of the conference on other participant computer stations. This allows each participant to maintain continuity with the overall presentation while also enabling individualized focusing and interaction with particular portions of the meeting materials.

The multi-media conferencing system also includes the ability for each participant to monitor and actually "see" who is participating on a map display and get detailed information about the participants in the session via individual avatars accessed through a geo-location map utility. A participant can hover over a map any time during the session and see, for example, who is participating, what company they work for, what specialty area they are involved in, what city and state they are in, and a picture of them (if the individuals download a picture when they build their avatar). The system also provides the ability for each participant to build an individual avatar or import one from Google or AOL. An avatar is a "mini-me" that identifies who you are, what your position is, what company you represent, what specialty area you are involved in, what city and state you live in, what your educational background is and a picture of you or a representative symbol that you choose for people to see, and may contain a wide range of other information and attachments at the avatar poster's discretion. The participants can each determine how much or how little information they want to share with others.

The multi-media conferencing system also includes the ability to see an attendee list so that each participant can quickly and easily identify who is participating in the session. Participants can also engage in text chat messaging with any other participant, which may including multiple chat recipients or single chat. The system also provides the ability to participate in virtual networking through identifying from the avatars and attendees listing someone with whom a participant would like to connect with after the session. A participant can easily send a quick chat and schedule to connect with another participant after the session. And, with a simple click of the mouse, any selected sector can be increased to full-screen size, retracted to partial-screen size, or minimized to an icon, with another click.

The multi-media conferencing system also includes the ability to provide immediate feedback written to the presenter, which advantageously allows the presenter to modify the presentation to fit the needs of the audience as those needs are communicated during the course of the conference. This includes very simple iconic messages such as a "smiley face" indicating that the responding attendee is doing great, a "thoughtful face" indicating that the attendee is a struggling a bit, or an urgent "what the heck face" indicating that the attendee has become lost or confused. An attendee may also text information to the presenter if there is something specific that the attendee wants the presenter to know or cover. The presenter can either field this information or can have an assistant field it so proper response is given to the feedback.

The presenter dashboard provides real time information that is coming to him by the attendees. When an attendee submits data to the presenter, the presenter receives a "number" indicator that there is information available for him to review. It also lets him know if the feedback is good or bad through a color indication-green for good, red for bad. The presenter dashboard also allows the presenter to launch surveys, quizzes, questionnaires, evaluations and tests and this is where the results would reside until uploaded in a report format determined by the presenter after the meeting.

The presenter has the ability to design "cliff notes" for his personal review during the meeting. These notes are designed as "reminders of information" to share with the attendees. The system also provides the ability to interact in an orderly manner with the presenter and other participants through multiple video feeds. Utilizing web cameras that range in price from $40 to over $100, the system provides the option of having multiple video feeds to provide that personal touch you look for in the face-to-face meetings. As the host of the meeting identifies who he wants to participate in an active video, he selects the participants name and the application sends a request to that participant to allow their web camera activation. Seeing someone's body language, facial expressions and covert attitudes is critical to ensuring a positive experience whether it's selling, training, strategizing, etc.

The multi-media conferencing system also includes the ability to have private video chats amongst the participants. Private chat sessions are screened in the application similar to having Instant Messaging with a web camera. A small video window opens up in the lower right hand corner of the computer screen of those participants having the private video chat.

The attendees can "travel" through 3DS models which allows them the opportunity to experience the point the presenter is making. Whether that model is a heart, lung, building, etc. each participant can independently manipulate the 3DS model, rotate it, enlarge it and travel through it for their own individual learning style. As with the data files identified earlier, the presenter or presentation is not impacted by the participants' manipulation and once finished they will rejoin the model review being emphasized by the presenter.

The ability to independently review whatever animation/video series is made available by the presenter. As with the data files and 3DS models identified earlier, the presenter or presentation is not impacted by the participants' manipulation and once finished they will rejoin the model review being emphasized by the presenter.

The attendees also have the ability to strategize, keep group notes, take meeting minutes, save discussion points, use the "parking lot" for items needing review at later sessions, etc. on a group noteboard. The group noteboard is real time and everyone can enter data on it at any time. Everyone sees what is placed on the noteboard, who placed it and the time the information was put on the board. At the end of the meeting, everyone can download, save and transmit the information on the noteboard as a "pdf" or other suitable file type. Every meeting participant also has a personal noteboard for their individual use and like the group noteboard, it can be downloaded, saved and transmitted for saving their work as a "pdf" or other suitable file type.

The sister to the noteboard is the whiteboard. All participants can script notes, draw or paste pictures to the whiteboard in an orderly method and the Master will be maintained as part of the archived session. All notes and drawings can be saved to individual computers through a "pdf" or other suitable file format that each participant has access to. Like the noteboard, all meeting participants also have a personal whiteboard that no one else can see and the contents can be downloaded, saved and transmitted as "pdf" or other suitable file types.

In one embodiment, participants are able to screen cast any electronic information to the whiteboard. Such information could include, for example, photographs, videos, audio clips and text documents. The information could include any electronic information available to any participant, including files stored on the participant's computer, files copies from the global computer network, etc. The whiteboard also includes a plurality of tools, including drawing tools, text tools, highlighting and underlining tools, etc. Typically, this can be done by selecting content (such as a file) to be posted on the whiteboard, then clicking on an icon (e.g., a camera shaped icon), placing the cursor in a desired location on the whiteboard and then clicking the icon again. This results in the content being posted on the whiteboard for access by all the participants.

The presenter has the ability to test/poll the participants real time with immediate results made available for the presenter. This is controlled through the presenter dashboard and all participants respond through a multiple choice process that allows auto calculation of the results. This is another tool used to gauge how well the presentation is being viewed and is also a monitor to see how the participants are "paying attention" to the presentation. The results are downloaded to a report system that allows the presenter to choose how he wants to view the overall and individual results.

The survey feature within the application allows a presenter/host to schedule different types of interaction with the attendees that include surveys, polls, pre-tests, post tests, quizzes, evaluations and exams. The application provides the presenter/host the option of releasing these at any point during the meeting. It also has a reporting mechanism that allows the presenter/host the option of running different types of reports on the results of these "surveys" that can be uploaded into Word or Excel documents for manipulation in graphical formats. An example of the data that can be downloaded is the results of a test by person and by the group including correct and incorrect answers. This download capability is designed to allow the presenter/host to forward results on to human resource departments for file inclusion, accrediting bodies for specific certifications, etc.

The presenter dashboard provides the presenter/host the ability to manage various parts of the meeting including reviewing instant feedback from an attendee. When feedback is received the presenter/host gets notification through the presenter dashboard icon. It will identify how many pieces of feedback have been received and if the feedback is positive the presenter dial is green, if the feedback is negative the dial is red. Once the presenter reviews the feedback the dial is reset to green and the number disappears.

The multi-media conferencing system also includes the ability to provide pictures, photos, brochures, logos and other image files that the presenter wants the participants to view. They can each view these images anytime during the presentation, independent of when others view them. As they click on the images, they populate from a thumbnail size to full screen and reduce again with a simple click. The image feature is designed to manage .jpg, .tif, .gif and other image files only.

The multi-media conferencing system also includes the ability to provide other attachments for the participants to review during the presentation that the presenter determines is critical to the overall session but that they may not review during the presentation. Again, each participant can review this information any time during the presentation independent of when other participants view it.

The ability to send attendees directly to a specific site on the internet is provided within the application. When you build hyperlinks and make them available in the attachment feature, the attendees can click on the hyperlink and it will take them right to the site, while they are still in the meeting. So they still participate in the meeting, see the presenter, etc. while they are reviewing the information the presenter has made available to them. And, for the groups that use internet tools like Google Docs, they can now collaborate in the meeting while Google Docs runs their real time collaboration document for project updates and modifications.

The ability to archive the entire session including all attachments, photos, polls, whiteboard information, models, feedback, etc. is also provided y the system. This allows others who could not be in attendance to participate in the meeting at a later date. This also allows the session to be re-reviewed by any of the participants for study or research purposes, etc. By utilizing the archived session, the participant viewing the presentation will be unable to interact with some of the information such as video chat, feedback, networking, etc. However, the presenter will be able to view what others' interactions/participation was.

By utilizing a key that allows the meeting to "remain available" all information will be viewable and accessible to individuals who have received a special code for them to join the meeting. The presenter can run a report on all activities within the meeting after it has ended. This allows the presenter/host to understand all aspects of what happened during the meeting and includes but is not limited to, information such as when and who opened any of the attachments, who and when downloaded the attachments, the text chat data from the meeting, an overview of what "instant feedback" was sent, when you enter and exit the meeting. The presenter/host will be able to run this report at their discretion.

All of the conference attendees can move from one screen to another with a simple "click on the icon". The toolbox driven application allows all participants to determine what "tool" they want to use during various points of the session. This keeps them interested, interactive and engaged in the session. Their choice is specific to them and does not impact what other participants do.

Conference attendees can also have breakout sessions where the presenter determines who and how long each break out session is. The attendee can visit each breakout session to review how they are doing and then the sessions come back together in a full session for review of results. In one embodiment, the presenter can assign each participant to a to one of a plurality of different breakout sessions. The participants assigned to a particular breakout session interact only with the other participants assigned to that breakout session. The breakout sessions will each have the same functionality of the general meeting system, except that a breakout session will allow interaction between only the participants assigned to that session. The moderator and the presenter will have the ability to enter any breakout session of their choosing. The presenter can start breakout sessions and set them to last for a fixed amount of time set on a timer, so that all participants return to the main meeting once the timer expires. The presenter will also have the ability to terminate the breakout sessions and force all participants back into the main meeting. The system can record all activity from each breakout session for later review. This can be useful for the moderator to monitor compliance with the purposes of the breakout session and also to archive information for later use. When a break out room (which is the virtual space in which a breakout session occurs) is designed by the moderator, the data from the main session goes to the break out room and the work done in the break out room comes back to the main session.

The multi-media conferencing system also has a "room check" feature that allows the presenter or teacher to ensure everyone is actually active in the session. When this room check is released by the presenter, everyone will receive a notification that gives a set period of time for them to respond by clicking on the requested notification which confirms they are active in the meeting. If they don't click on the notification, the application will automatically log them out.

The attendees have the ability to electronically raise their hands" during a presentation/meeting so they can ask questions of the presenter/host. The presenter/host sees that action and can respond accordingly. Once the presenter/host has addressed their question/comment, the application removes the notification to the presenter/host.

The application is further designed so that desk top sharing is an option for any meeting/company. In order for desk top sharing to occur all meeting participants may be required to download an executable file that will allow the application to manage what everyone see through a desktop sharing process. Desktop sharing is featured in one of the sectors of the application which allows the rest of the application to still maintain its interactivity and data sharing and manipulation.

The invitations have a "sync with Outlook Calendar" button that allows any meeting invitee/participant to ensure the meeting is on their main Outlook calendar. Once the sync button has been activated, the meeting populates the calendar and provides the meeting link and the meeting reminder driven off the Outlook calendar function.

A cost savings meter is provided to calculate how much the application saves the company on a per-meeting or per-month basis. By inputting the number of attendees and estimating the cost of airfare, hotels, and other travel expenses the application will reflect the ROI (return on investment) the company is experiencing.

A carbon footprint calculator is also a part of the value proposition for an organization. By utilizing the carbon footprint calculator to identify flight and road fuel consumption savings, the system can provide reporting to the company for the appropriate tax credits, etc.

The company dashboard allows the organization to manage and report on the usage of the application on an individual, department and divisional basis. This information will be able to be reported on and uploaded to various reporting tools for graphing, charting, etc.

Integrated conference calling and VOIP connections to allow both mediums of audio transfer to work, based upon the choice of the attendee. By integrating a conference line and VOIP, attendees can choose which means of audio they prefer and will then be added to the audio portion of the meeting.

The application has 3 methods of communicating with others in the meeting. First, there is a text chat that allows everyone to communicate with everyone in the meeting by typing text into the text chat area. Once an attendee hits the send button everyone sees the information that has been typed, who sent the text chat and what date/time the text chat was sent. The second means of communication is between an attendee and the presenter and is private between the two. An attendee can send a private message through the instant feedback function and when the presenter receives the data it identifies who sent it, the feedback sent and the date/time the feedback was sent. This instant feedback is only between the two individuals and is real time. The final means of communication is instant messaging within the application. This allows an attendee to send a private message to another attendee or attendees, based on choosing the name from the attendee list that they would like included in the instant message. The instant messaging is not stored nor saved within the application and upon the meeting ending, this information is lost. The other two methods of communication are saved and reported on at the end of the meeting.

The video sector allows multiple live video feeds and, based on the presenter's choice. The host of the meeting identifies how many presenters they want involved in the video sector and based on the choice, the specific number of panes will populate for simultaneous video feeds. Multiple video feeds can challenge an internet application due to the bandwidth necessary to manage the streaming video. As the internet improves the methodology of streaming videos, the application will handle multiple video feeds simultaneously.

The video feeds can be recorded through a simple click of a button and the discretion of the presenter. This allows individuals who could not attend the live session the opportunity to enter the meeting after it has been held and listen to the presenter and enjoy the actual data sharing of the meeting.

The audio can also be recorded in time with moving through the presentation. So, as the presenter is speaking and moving through the slides of the presentation, the sequence is recorded with the voice for automatically changing the slides for viewing after the meeting.

The entire meeting can be archived for access and review after the meeting has been held. This would include any aspect of the meeting a host chooses to archive for future review/use.

The application has a complete library of information that includes invitees that can be managed by departments, groups or divisions. It also manages the actual data/information being uploaded and shared in meetings. This library allows the owners of the original data to determine if they want to share it with others in the organization for their use or if they want to keep that data in their personal library. This feature also provides significant time savings because once data/information has been uploaded; it remains available for use subsequently decreasing the amount of information and time to continuously upload information.

A presenter driven e-Tab is available for use. This allows a presenter/host to manage what information is called from the internet and is fully manipulated by the presenter. The application also has a highlighter that allows the presenter/host to "highlight" any item in any of the sectors and information. The presenter/host can choose from multiple colors from the highlighter board.

Along with the opportunity to have a private text chat with other participants of the meeting, the application also allows participants to have private video chats. If a participant has a web camera they can privately choose another participant with a web camera and invite them to a video chat. At the point of acceptance, two small video windows will pop up at the bottom right hand side of the computer screen and they will be able to communicate and view each other privately.

The application identifies on the attendee list those participants who have web cameras so everyone will know who they can have video chats with along with giving the presenter an opportunity to invite someone to be a presenter on the fly.

The application allows a presenter/host to have two presentation sectors running at the same time. This feature ensures the presenter can effectively manage the complete set of data necessary to give the impact they are looking for during their presentation and eliminates the need to continuously move from one set of information to the other.

The application has the ability to allow Word and Excel information uploads in a specific sector. This allows the presenter/host to release information for the attendee to see only when the presenter/host is ready and they can review the information without having the ability to save the data to their computer. This provides information sharing while maintaining the security/confidentiality of the documents being reviewed.

The application allows the presenter/host the ability to upload a Word or Excel document that all attendees, including the host/presenter, can modify real time while everyone else sees what's being modified. This allows for things like contract negotiations, budget reviews and other critical and time consuming revisions can be made during an on-line meeting that everyone agrees to before leaving the meeting. This provides a solid collaboration tool and saves time and money as the document is managed with all participants actively involved.

The application has various reporting capabilities that are all designed to allow each host/presenter to determine how they want to view the data in their personalized presentations. This includes graphical and text viewing along with the ability to upload test results to be delivered to the specific accrediting bodies. These results reports are compliant with SCORM regulations.

The application gives the host/presenter the ability to upload documents any time prior to a meeting starting and after the meeting has started. If a presenter/host needs to add a new document to the meeting, they simply grab the necessary document while they are in the meeting and once it has completed the upload process, all meeting attendees hit a "refresh" key in the application and the new data is populated for access.

The host/presenter can add an invitee at any time before and during the meeting. The process to add the invitee is simply moving to the Admin screen, clicking on or typing in their e-mail address and hitting the "Send Invitation" button and they will receive the invitation to join the meeting.

To access the application, everyone must typically first log in. The preferred system is PCI compliant and is protected with SSL and other security modes to ensure all data remains confidential. Because the application is managed through the internet these security measures are a must to ensure our customers have the confidence that their data is safe. Each log in is based on an individual e-mail account and a secure password that is set by each person.

There are typically four (4) roles that the application is designed around. Participation in the application is driven by these roles. The administrator of the company plays the role of purchasing, upgrading and identifying who will be given the host role. This role has sole responsibility to manage the purchasing company's designees for hosting meetings. The application is driven off subscriptions designed around the number of hosts and participants per host.

The role of the host is to schedule meetings and invite the various parties to the meeting. A system user can be the host for one presentation while also participating as a presenter and an attendee at other meetings at the same time (or at other times) and the application automatically identifies the role based upon the meeting that the user is entering. The role of the presenter gives the ability to upload meeting data and information into the meeting where the person has been given presenter rights. A presenter can also be a host or an attendee in other meetings, again driven by the meeting.

The final role is that of an attendee which allows a participant to only attend a meeting or edit his or her individual profile. This role has the fewest rights within the application. But an attendee for one meeting can still be a host for another. The role is driven by the specific meeting being attended and the Meeting Wizard determines what the attendee will see based upon that specific meeting information.

Anyone can be associated with more than one company and enter the application based on their rights within that company. This allows consultants to manage their clients and participate in different roles with different organizations. By choosing the company you are associated with, you get different rites within the application.

The application has a Wizard Meeting Manager that allows the host to easily schedule and manage the meetings. When the host logs into the application it is prepared to assist in processing the data for the meeting. Identifying who will be attending your meeting and what role they will play is as simple as adding their e-mail address and selecting either presenter or attendee. Once you have invited someone to a meeting, their e-mail information is available for re-use by either moving through your list of "Available Users" and placing a check by their name or by doing a search for their name.

Hosts have the ability to build divisions/departments that will house e-mail addresses for people within those divisions/departments. An example would be a Sales & Marketing Department or specific customer contacts. This makes managing the meeting scheduling and invitation area significantly easier for the host.

The application has an import "invitees" feature that allows a company to use an Excel template and place data from mailing lists into the template for bulk invitations or webinars. The application sends out invitations to the various individuals based on their role in the meeting. No one can enter a meeting without receiving an invitation. As the host is identifying the meeting participants, the application saves the input or contact file. By building departments or groups, the host can easily manage the numerous meeting participant lists. This system saves significant time since it is intuitive and organized for the meeting host and they no longer have to look up e-mail addresses over and over again for potential meeting participants. Once they have invited them to a meeting their contact information is stored for re-use by the host.

Once the invitations have been sent, the host receives acknowledgement that the invitations have successfully been sent. This allows the host to move forward with scheduling the rest of the meeting. The host has the ability to add invitees to the meeting at any point before or after the invitations have been sent, and if a second round of invitations gets sent only the invitees who did not receive an invitation on the first round will receive the invitation on the second round. Invitations can be sent at any point in the meeting set up. If the host logs out of the meeting wizard and has not sent the invitations, the application will "notify" the host that the invitations have not yet been sent and will ask if they want to proceed with leaving the meeting wizard.

By clicking on the link in the invitation, it takes the individual to the log in page. Once there, they log in using their confidential password and the application lands them on their "Meeting Page". The application may require a host/presenter to be accountable for the meeting in every aspect. The host/presenter should not only think through when the meeting will be and who will be invited, but they should process who will present at this meeting, what's the purpose of the meeting and what "Meeting Assets" are required to have a successful meeting. The meeting assets are those items that the host and/or presenter uploads into the Meeting Wizard that will allow the attendees to experience the virtual interaction during the meeting. The process of uploading meeting data or information may be a simple browse, choose and save process, which is similar to attaching a document to an e-mail. By clicking on the Meeting Assets, you see the areas that allow data or information to be loaded for the meeting. By choosing a particular tab, you simply browse your system and upload/save the file that you want to make available to the meeting attendees.

Once a host/presenter has chosen and uploaded the asset, the application notifies the presenter that it has been successfully uploaded and it is ready to be utilized when attendees join the meeting. At any point prior to the meeting, the host/presenter can remove assets from the meeting. This is a simple choose the asset to remove and click the "Remove from Meeting" button. The Wizard will move the asset from "Selected Assets" to "Available Assets" so they can be used again in the future. However, once a meeting has been held, meeting assets are tied to the archiving feature and cannot be removed or deleted from the meeting.

As the host/presenters move through each of the areas of the Meeting Wizard, they can upload the assets for a specific sector. The Meeting Wizard will grab the data as you upload it and place it into the correct sector for the actual meeting. Once an asset has been uploaded, and provided a company has purchased archiving, the company will have a library that houses all meeting assets for future use. Each host/presenter can determine if they want to allow anyone who has presenter/host rights to utilize their assets or make them available only to themselves. A quick choice in the radio button when downloading the asset determines who will be able to access these assets for future use.

The host/presenter can also determine when he or she wants to allow the attendees to see and manipulate certain data that has been made available for the meeting. By choosing "Initially Release", the information will be available to the attendees when they enter the meeting. By choosing "no" under "Initially Release" the presenter maintains the right to determine when the attendee will actually have access to certain data/information.

The Meeting Wizard will only let users upload certain types of files in each segment of the Wizard and will inform you of the inability to upload a particular file in the wrong zone. The "admin" area of the application manages meetings for the host/presenter. When users log in, they immediately see their upcoming meetings. The user's past meetings are also presented in a different area for viewing. If a meeting has been held but is "held open" by the host, the user is able to join that meeting and view the various items within the meeting that were available during the meeting. If a presenter/s has recorded their video/audio, the user will be able to play the meeting back and participate in all the information sharing that occurred during the original meeting.

The Administrator has access to manage the company profile (Manage Company) and determine the number of hosts/participants along with identifying who within the company is designated as hosts. The Administrator also makes changes to the company profile should any corporate information change.

Everyone who uses the application, whether invited to a meeting as an attendee, a presenter or a host, has the opportunity to build their individual profile in order to join the meeting. There is minimal information that is typically required, but each individual can add as much personal/professional information as they desire. Each participant can also upload a personal photo, image or icon that you want to represent you in building your personal avatar. Avatars are not required but can be built and customized uniquely to you. Once your profile is built and saved, you have the opportunity to make changes any time you need (Edit Profile).

The application has the ability to "house" a biography of the presenters, including an image/photo that all attendees will see while they are waiting for the meeting to begin. If a presenter does not want to use a biography, the attendees will see the following: Please wait for the Presenter to Join the Meeting. Once the meeting is over, the application can automatically, at the host's discretion, send out either a Thank You for Attending or a We Are Sorry You Couldn't Attend e-mail. The application also automatically sends an e-mail out to all invitees if the meeting is cancelled or if the meeting is postponed or the date and/or time changed.

The attendees of the meeting can alert the presenters to their questions or input through an electronic hand raising feature. The application "highlighter" is controlled by the active presenter. This highlighter acts as a "laser pointer" or "active highlighter" to ensure the meeting participants can easily see where the presenter is in a particular part of a document/presentation. This highlighter can be used in any of the sectors of the application to bring the attention of the attendees to that particular area, including the noteboard and whiteboard.

Data surrounding the meeting is collected and reported, such as [0109] Who signed in to the meeting [0110] What time they entered the meeting [0111] What time they logged out [0112] Who opened each attachment [0113] What date & time did they open the attachment [0114] Who downloaded each attachment [0115] What date & time they downloaded each attachment [0116] Feedback sent to each presenter, by whom and time [0117] Results of all surveys, tests, polls, evaluations, quizzes, etc. in multiple reporting options [0118] Public text chat [0119] Group whiteboard with detail [0120] Group noteboard with detail All information/data collected and reported is automatically sent to the host of the meeting in a format that is easily sorted and charted.

The host/presenter can schedule quizzes and tests using the application. It has the ability to "grade" the test and give the results to the presenter immediately. This function also provides for report uploading so each attendee's test results are scored separately and as a group for the instructor to see the data/statistics as they need. The presenter can see the group results immediately in a text or graphical format. They will have access to individual results after the meeting is over and the application has completed the report upload. At that time, they can determine how they wish to see the data reported and can use these reports for certifying CE credits, personnel files, etc.

The application allows for document collaboration and change real time with the ability for the "group" to accept the changes and to record the "acceptance" by each attendee/participant. An example of this would be a document being drafted between two different legal firms for a client. The document can be uploaded and at the point they are ready to work on it, it can be displayed in one of the presenter controlled sectors. Whoever is the active presenter can modify the document with the participation and immediate approval of the other meeting participants/attendees.

A meeting participant/attendee can choose how they view the information in the application. If they would like to maximize a specific sector and still see the other sectors for activity, they can choose to their view to show them 3 thumbnail sectors and 1 max-sized sector.

There is an asset library that is specific to the company and to the individual hosts of the company. This asset library is customizable by company/host and allows for easy filing of individual assets to provide quick access to already uploaded data/files. The asset library is available only if a company chooses to archive their information with the system.

The application has the ability to permanently disable a person from access to any company held meetings. This is controlled by the Administrator. The application also has the ability to have two presentations running simultaneously during a meeting.

The active presenter can choose to have an assistant manage the presenter's dashboard so the flow of information and feedback is managed in a timely manner to and from the participants/attendees. The function is performed with a simple click during the meeting scheduling process. By choosing the "dashboard to an assistant" offload, the presenter is free to fully focus on the content of the meeting and the assistant can collate data, feedback and questions as they come through and feed this information to the presenter based on their agreed process.

The architecture of the system is compatible with the various mini-cams that are currently on the market. Many of these are low cost and it is the only "hardware" requirement outside of either a desktop or laptop computer. If the participants decide to use VOIP which is an integral part of the application, a USB headset is preferable. It is not a requirement but it significantly enhances the audio experience in a VOIP meeting. The system architecture is also designed to be secure for the various users of the application. Each organization will have its own "secure community/library of information" that is designed through a secure socket (SSL) and password driven/protected. The administrator of each community will have the rights to add, change and delete users with their community. This allows all archived sessions and documents to be accessed only by those with the designated privileges and ensures the users that information cannot be taken, copied or viewed by other organizations or guest participants.

The system allows the presenter and the attendees to derive all the benefits of being there while providing the economies of "attending" from the office. An attendee logs into the meeting via their computer, desktop or laptop. The host ensures the video/audio is captured for archiving purposes along with all other aspects of the session such as the whiteboard, attachments, etc. The interactive audio and video program will be captured for the presenter at a hosting presenter station. The audio and video streams are encoded and produced in a manner such that the participants receive the streamed data in a substantially real-time manner. Similarly, audio/video streams will be captured from the participants, encoded and produced and received by the presenter and other participants in a substantially real-time manner.

Bandwidth limitations may affect any such system subject to modeling and simulation solutions to determine the optimal environments to achieve the desired goals and objectives of the system users. However, the application is designed to be accessed via the web and therefore the traditional method of downloading information to the users' laptop with a desktop sharing by the presenter is not utilized. This new method of access has a significant impact on the speed of the data being delivered to all parties.

Retrievable parameters are logged during the conference. As a participant views the conference at a time after, or during real-time presentations, the essence of the conference presentation and the timing of the individual elements are essential to capturing the conference "flow". Such parameters include: audio/video, PowerPoint and Excel timings, document manipulations, chats, questions, answers and comments. 3DS modeling, animation/videos, participant feedback presented in graphical form including the timing and content of emotions; survey results, etc. are also parameters that must be logged for timing within the actual presentation. The "wrapper" that houses all of these elements is also "serialized" to allow the participant to organize views, manipulate elements and screen layout to an organizational structure that is pleasing and customized to the participants' preference. Personalization and interactivity is the key to the success of the overall application.

Referring to FIG. 1, the multi-media conference system 10 includes a conference server 11 that integrates a number of participant computer stations via a computer network, such as the Internet or other suitable local or wide area network. The participant computer stations include one or more presenter computer stations 12a-n and or more attendee computer stations 14a-n. The system can accommodate multiple conferences potentially involving different groups of participants conducted at the same time or at different times. A host computer station, which may or may not be active as a participant in the conference, controls conference scheduling and notification, invitations to the conferences, participant access control, assignment of the presenter's baton, and other aspects of meeting administration. Of course, there may be different hosts for different meetings, represented by the multiple hosts 15a-n. The host may be separate from the presenter or, if a separate host is not present, the presenter computer station typically serves as the host.

A conference recording and reporting system 13 records conference proceedings and creates a variety of reports concerning operation of the system and individual meetings. Corporate reports detail system usage, such as which hosts have conducted or scheduled conferences, the identities of conference participants, the length of the conferences, the information resources (e.g., attachments, video feeds, etc.) displayed at each conference, and so forth. Individual meeting reports contain recordings of individual meetings, which can be played back following the conclusion of the meeting. A hierarchical security system allows a system administrator to control access to corporate and meeting reports. In most cases, the host of a meeting typically controls access to recorded meetings, while the system administrators have access to corporate reporting and control functions.

The conference recording system can record all data made available to the participants of a meeting, including all presentations, text and videos, on a central server. The recorded meeting can then be made available to the participants (or others). The participants can then access the meeting as though they were attending it.

The presenter and attendee computer stations implement similar functionality except that the presenter computer station has control over certain presenter functions that are not available on the attendee computer stations. Although only one participant computer station may typically function as the presenter computer station at any particular time, the system also allows a presenter's electronic "baton" to be assigned to different conference participants at different times so that the functionality of the presenter computer station can be implemented on different participant computer stations, as desired, during the course of a conference. To prepare for a meeting, the presenter uploads conference material 16 into the conference server 11, which usually include at least a slide presentation and may also include a wide range of other information resources, such as 3D models, text documents, graphical images, photos, spreadsheets, and so forth, in a wide range of file formats supported by the system. These resources may be uploaded before or during a conference for display on participant computer stations during the meeting. The system also allows attendees to upload conference materials 17a-n, such as attachments and interactive feedback in connection with the conference. In general, any meeting participant can upload any type of supported information resource, display the material uploaded by other participants, download a personal instance of the material, modify to personal instance, and save the personal instance with modifications.

The system also allows each participant to upload a personal information avatar, represented by the presenter avatar 18 and the attendee avatars 20a-n. The avatars typically include at least the participant's name, which is used to identify the participant in a participant list, and physical location, which is used to show the location of the participant on a geo-location map display. Each avatar may also include more detailed information, such as a photo and biography, and attachments, which may be multi-media files such as voice files, images, and so forth. Basically, each participant can decide how much information, and what kind of information, to include in and attach to their particular avatar.

Figure 2:
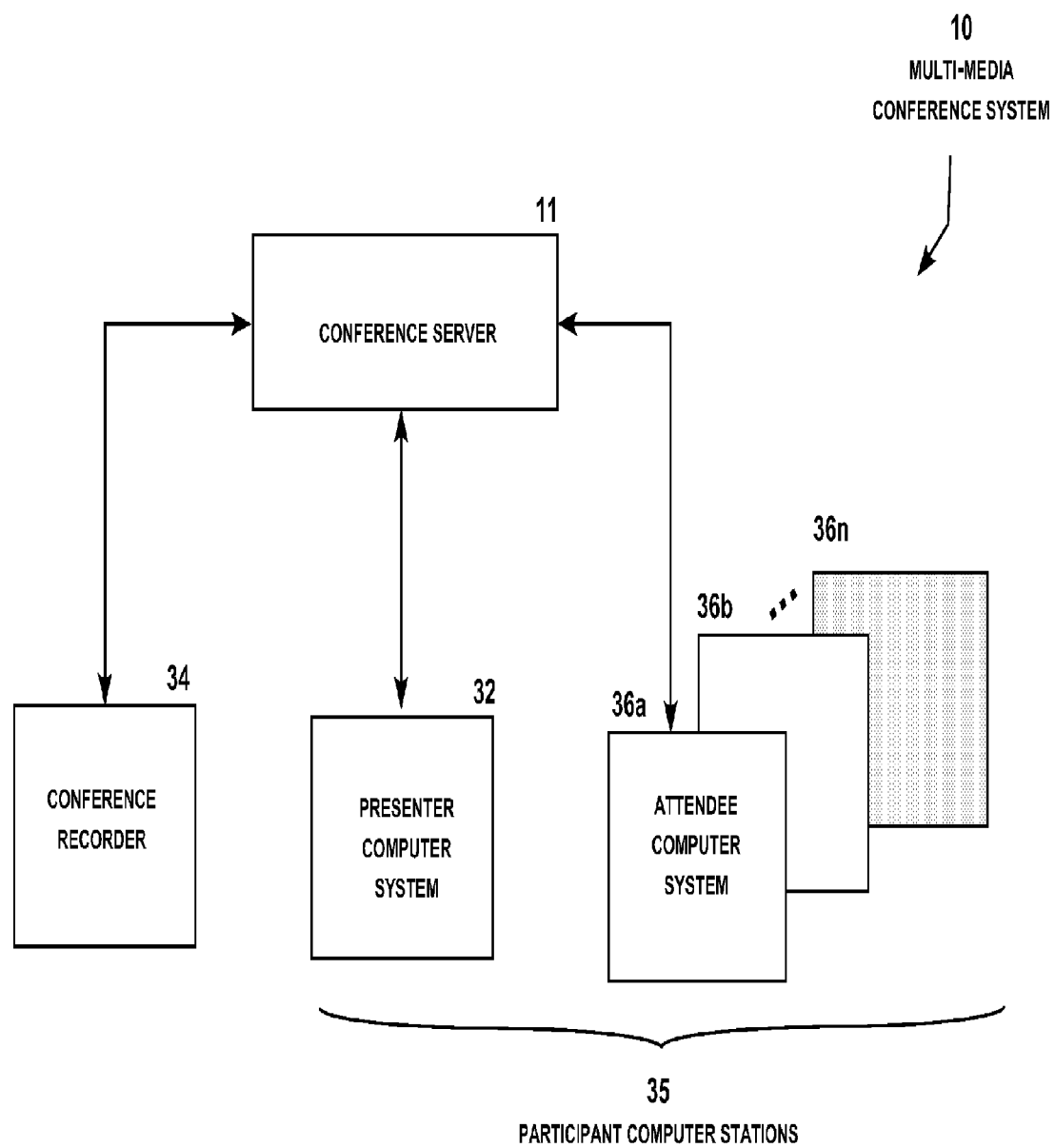
FIG. 2 is a typical computer architecture diagram of the multi-media conference system.

FIG. 2 is a typical computer architecture diagram of the multi-media conference system 10 implementing a particular conference for a group of meeting participants at a particular point in time. The conference includes one of the participants in the role of presenter (i.e., one of the meting participants currently assigned the presenter's baton) at a presenter computer system 32. The host or presenter has the option of activating conference recording, which causes the conference presentation to be saved in the conference recorder 34. The other meeting participants are in the roles of attendees at the attendee computer systems 36a-n. In this example, the presenter computer system 32 or another non-participant may serve as the conference host. A participant computer stations 35 include the presenter computer system 32 or the attendee computer systems 36*a-n*.

FIG. 3A is a high-level conceptual illustration of functionality available through the presenter conference display 33 displayed on the presenter computer system 32. Similarly, FIG. 3B is a high-level conceptual illustration of functionality available through the illustrative attendee conference display 37*a* displayed on the attendee computer system 36*a*. The presenter conference display 33 includes separately adjustable presenter defined content 40 displayed on a portion of the screen along with separately adjustable presenter or attendee defined content 42 displayed on another portion of the screen. Similarly, the attendee conference display 37*a* includes separately adjustable presenter defined content 44 displayed on a portion of the screen along with separately adjustable presenter or attendee defined content 46 displayed on another portion of the screen. Each sector on each participant display is separately adjustable in that the size of the sector can be maximized to full-screen, set to partial-screen view, or minimized to an icon. Volume, start, stop and pause functions may also be enabled for separate control on attendee computer stations, as desired.

As shown in FIGS. 3A-B, the presenter and attendee conference displays are both operable to display the same types of information, in which some sectors show content controlled by the presenter (presenter defined content 40, 44) and other sectors show content controlled by the presenter or the attendee (presenter or attendee defined content 42, 46) at the selection of the participant. Typically, two sectors displayed on the top half of the screen are devoted to presenter defined content 40, 44, such as a video sector and a slide presentation sector. This allows every participant to experience the same presenter defined content 40, 44 at the same time. In addition, each participant can individually select among a wide range of presenter or attendee defined content (presenter or attendee defined content 42, 46), such as a geo-location map or various attachments, for display on the bottom half of the screen. As a result, each participant conference display is operable to show content that is common to all participant conference displays on a portion of the screen along with individualized that is limited to all participant conference displays on a portion of the screen. Notwithstanding the synchronization of content on the presenter controlled sectors, each participant still maintains a level of adjustability over these sectors including at least the ability to adjust the size of every sector on their conference display.

Figure 4:
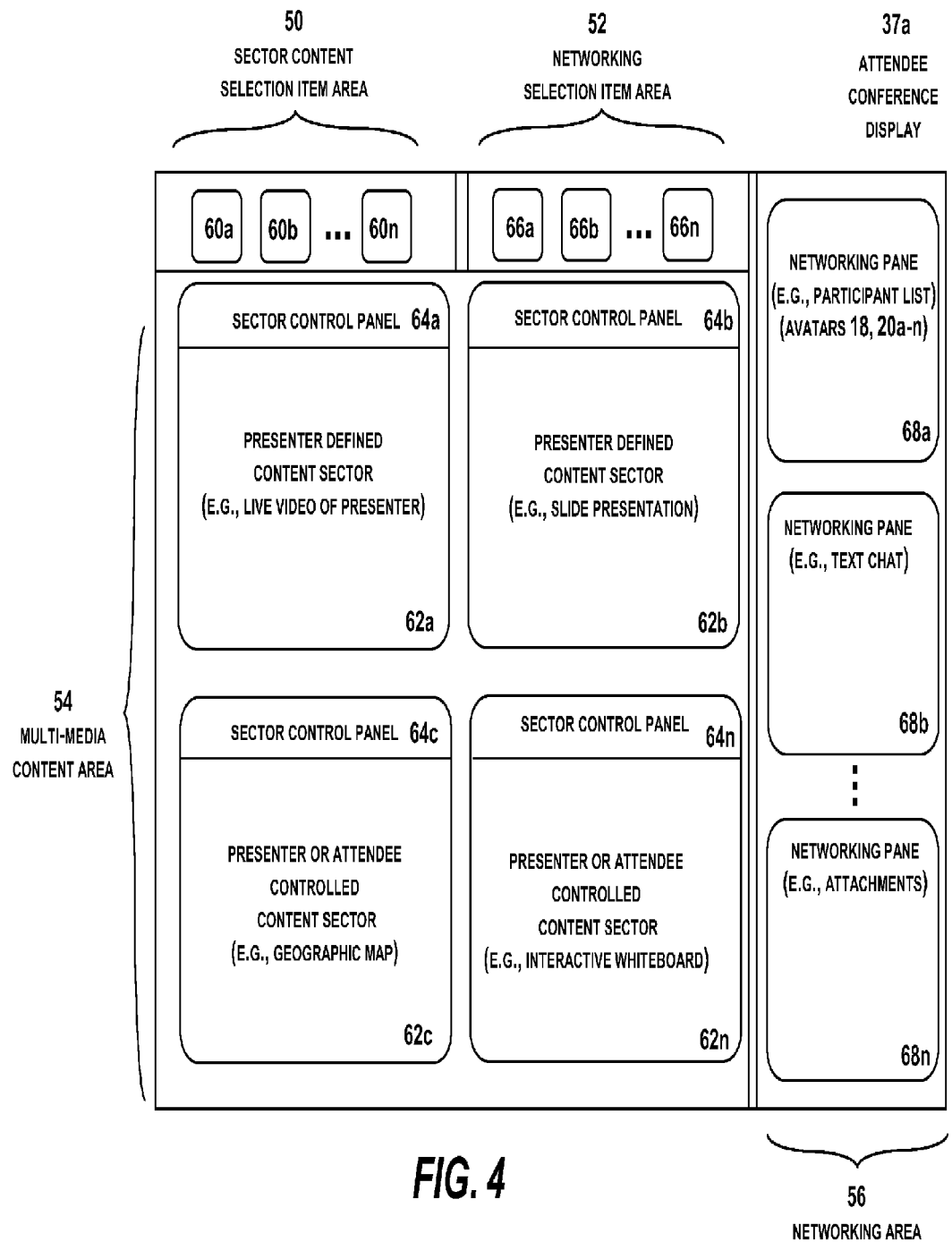
FIG. 4 is a conceptual illustration of an attendee conference display in the multi-media conference system.

FIG. 4 is a conceptual illustration of an illustrative attendee conference display 37*a* in greater detail. The conference display is configured to simultaneously enable a wide range of presentation content and networking among meeting participants. In general, the attendee conference display includes control items including sector content selection items 50 and networking selection items 52. The sector content selection items enable the user to select content for display in a multi-media content area 54, whereas the networking selection items enable the user to select networking utilities for display in a networking area 56. Although the multi-media content area 54 may be divided into varying numbers of sectors, a four-sector "quad" display has been found to be suitable for many situations. The multi-media content area typically includes two presenter defined content sectors 62*a-b*, each with an accompanying sector control panel 64*a-b*. The upper left content sector 62*a* is usually devoted to a video feed, such as a live camera feed from the presenter's location or a pre-recorded video file on the presenter computer station.

The upper right content sector 62*b* is usually devoted to a slide presentation, although other material such as a spreadsheet, image file, 3D model may be displayed in this sector if desired. Each participant may select individually among content options for display in the bottom sectors 62*c-n*. In one alternative, the bottom left sector 62*c* may be used to display a geo-location map showing iconic representations of the locations of the meeting participants, while the bottom right sector 62*n* may be used to display a personal or group whiteboard. A variety of personal and group noteboards, personal and group whiteboards, and attachment files may also be displayed in the lower sectors 62*c-n*.

The networking area 56 displays a number of selectable networking items, such as a participant list in networking pane 68*a*, text chat in networking pane 68*b*, and a list of selectable attachments in networking pane 68*n*. The illustrated content and networking items shown in FIG. 4 are merely illustrative, however, as other types of selectable content items (e.g., 3D model, spreadsheet, CAD file, etc.) and networking items (video mail, network chat, etc.) can alternatively be displayed, as selected by the participants. The sector control panels 64*a-n* display control items for controlling their respective sector windows, such as size control items, scroll control items, volume control items, and so forth.

Figure 5:
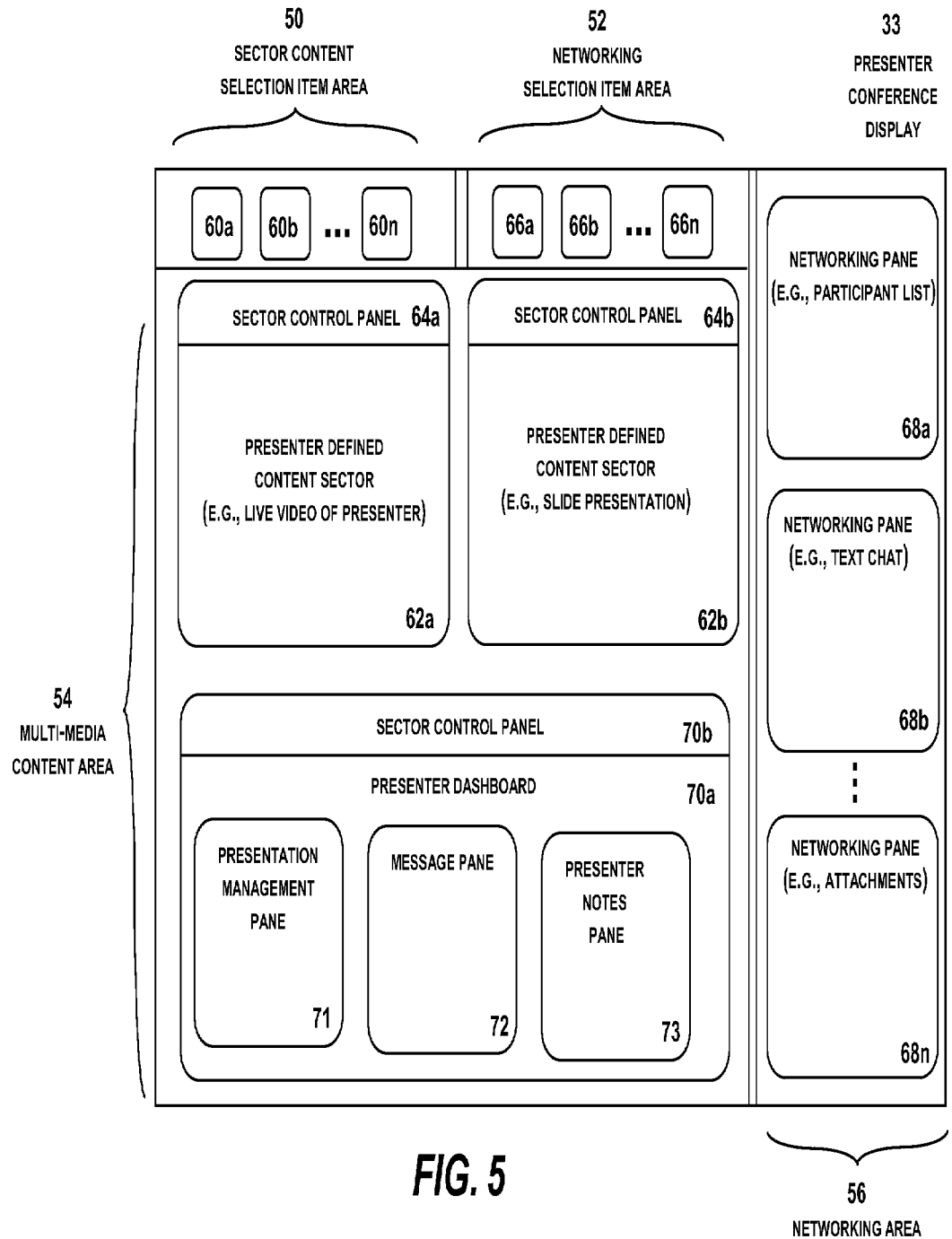
FIG. 5 is a conceptual illustration of a presenter conference display including a presenter dashboard in the multi-media conference system.

FIG. 5 is a conceptual illustration of the presenter conference display 33, which is basically the same as the attendant conference display except that the presenter computer station is in control of the content displayed in the presenter defined content sectors 62*a-b* and the presenter has access to the presenter dashboard 70*a* and associated sector control panel 70*b*. The presenter dashboard is operative to display a number of selectable windows for use by the presenter during the conference. Three illustrative windows are shown in the example presenter dashboard, including a presentation management pane 71, a message pane 72, and a presenter notes pane 73. The presentation management pane 71 includes control items for managing the presentation, such as items for controlling conference recording, issuing interactive feedback such as polls, surveys and tests, room check, meeting access, information resource access, and so forth. The message pane 72 allows the presenter to receive and respond to text messages and attachments received from other meeting participants during the course of the meeting. The message pane typically remains live during the meeting so that any attendee can send messages to the presenter and receive responses in real time during the meeting. The presenter notes pane 73 allows the presenter to enter, edit and display notes that are not shared with the other meeting participants. The sector control panel 70*b* displays control items for the sector control panel including the ability to select different utilities for display in the dashboard.

Figure 6:
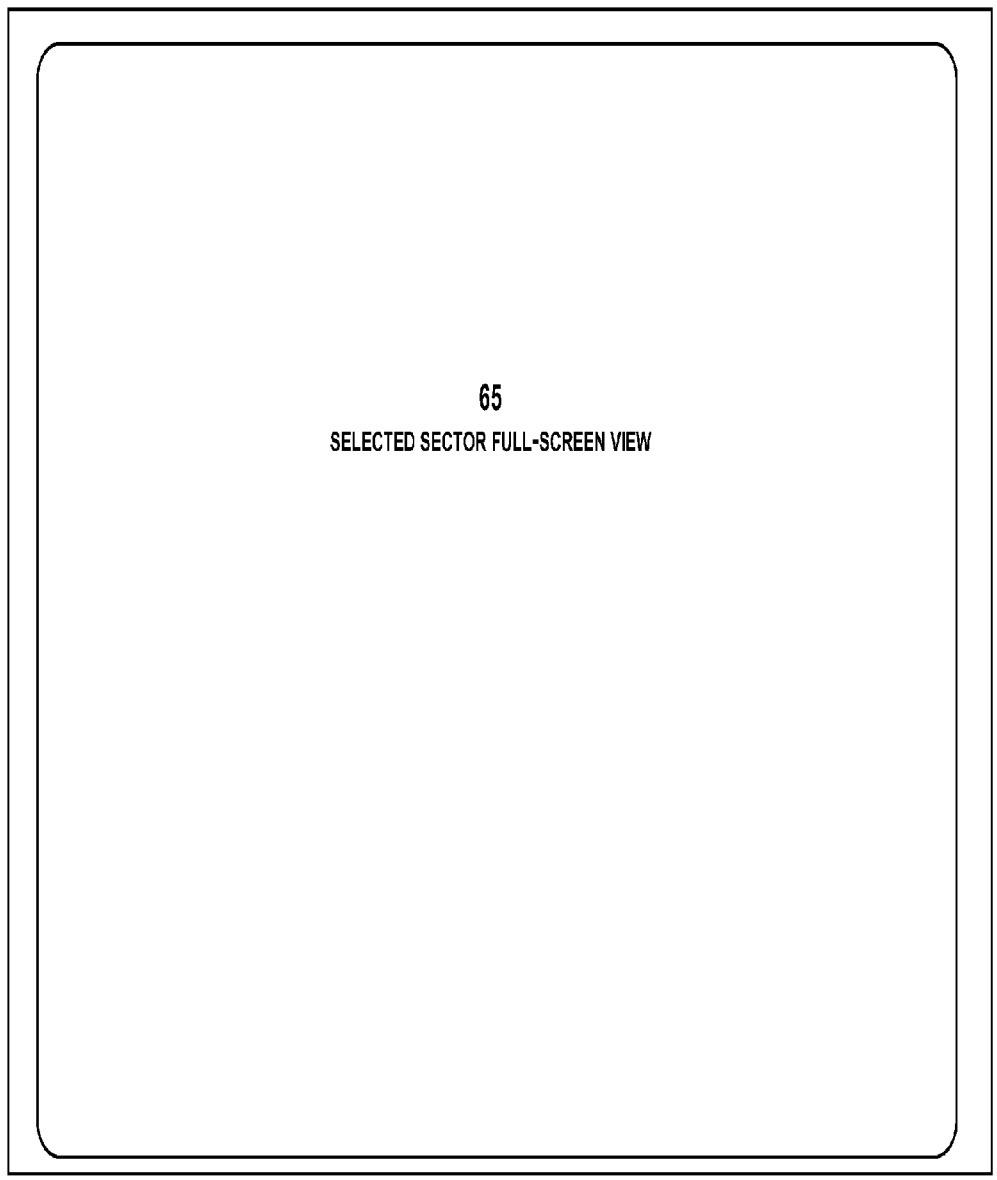
FIG. 6 is a conceptual illustration of a presenter conference display including a presenter dashboard in the multi-media conference system.

FIG. 6 is a conceptual illustration of a participant conference display 35 in which a selected content sector 65 has been expanded to full-screen. Each participant typically has the ability to independently maximize any content sector to full-screen, reduce to partial-screen, or minimize to an icon without affecting the conference display on any other participant's conference display. Although the system is configured to allow each attendee to have this capability individually, the presenter management pane may also include selectable control items for locking or resetting the presenter-controlled content sectors on all or selected attendee conference displays, as desired. The presenter management pane may also allow the presenter to lock or reset the size of the presenter-controlled sectors while allowing the attendees to control the size of the other sectors. Therefore, the ability of the individual attendees to resize their sectors may be uninhibited or controlled to some extent by the presenter, which may be set as desired as a system parameter.

Figure 7:
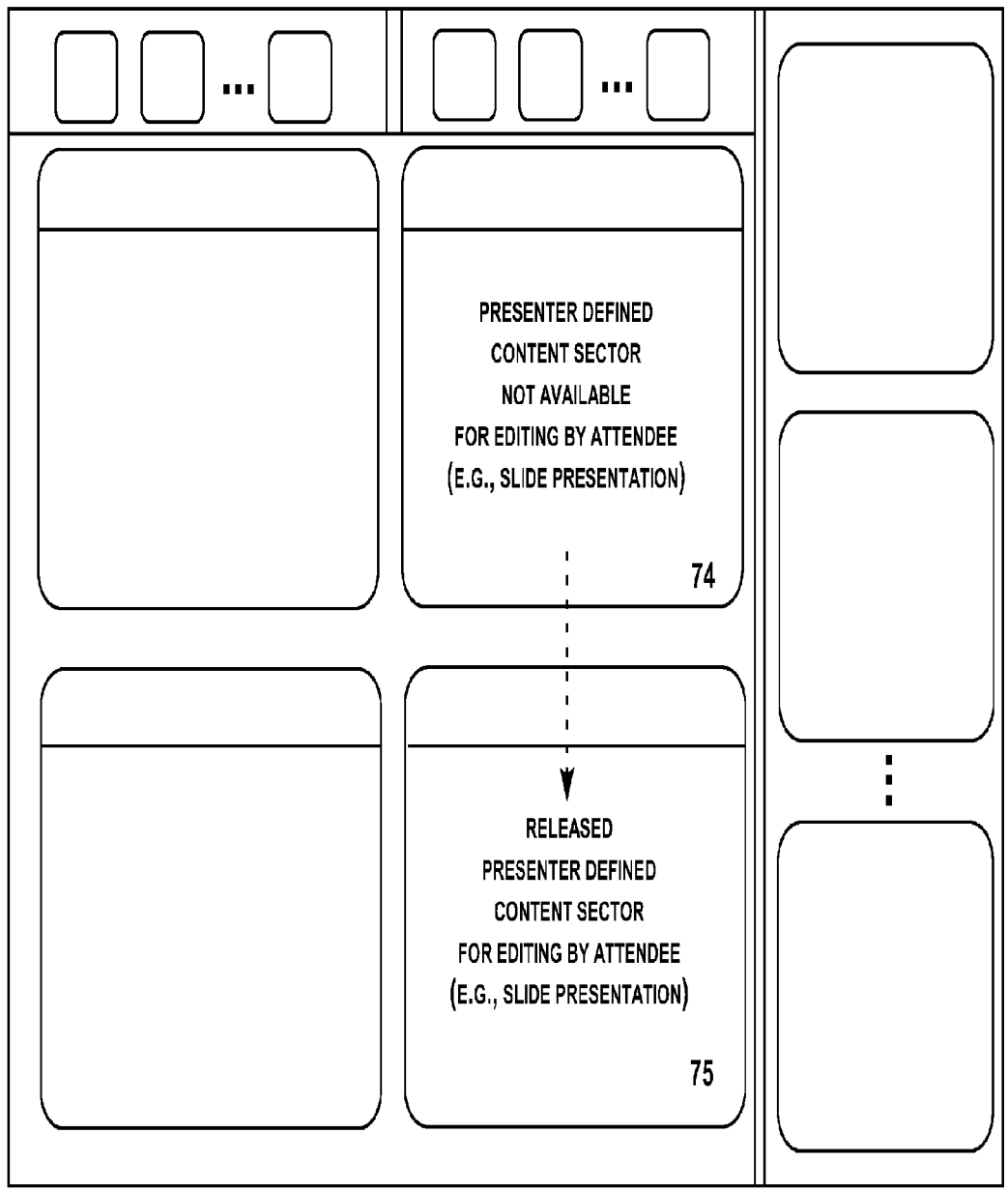
FIG. 7 is a conceptual illustration of an attendee conference display in the multi-media conference system in which the content in a presenter-defined sector has been released for editing by an attendee.

FIG. 7 is a conceptual illustration of the attendee conference display 37a illustrating the release of presenter-defined content for editing by an attendee. The upper right content sector 74 is typically used to display a slide presentation controlled by the presenter computer station. The system is configured to allow the presenter to release control of the slide presentation, which causes an instance of the slide presentation to be downloaded from the conference server to the attendee computer station. The new instance (personal instance) of the slide presentation is then displayed on the attendee computer station, typically in an attendee-controlled sector 75 directly below the presenter-controlled sector 74 displaying the presenter's version of the slide show. The attendee may then edit the attendee's instance of the slide show independently from the presenter-controlled instance. The attendee-edited instance may be displayed only on that particular attendee's computer station or displayed generally to the other participants. The attendee may also save the modified personal instance of the slide presentation.

Figure 8:
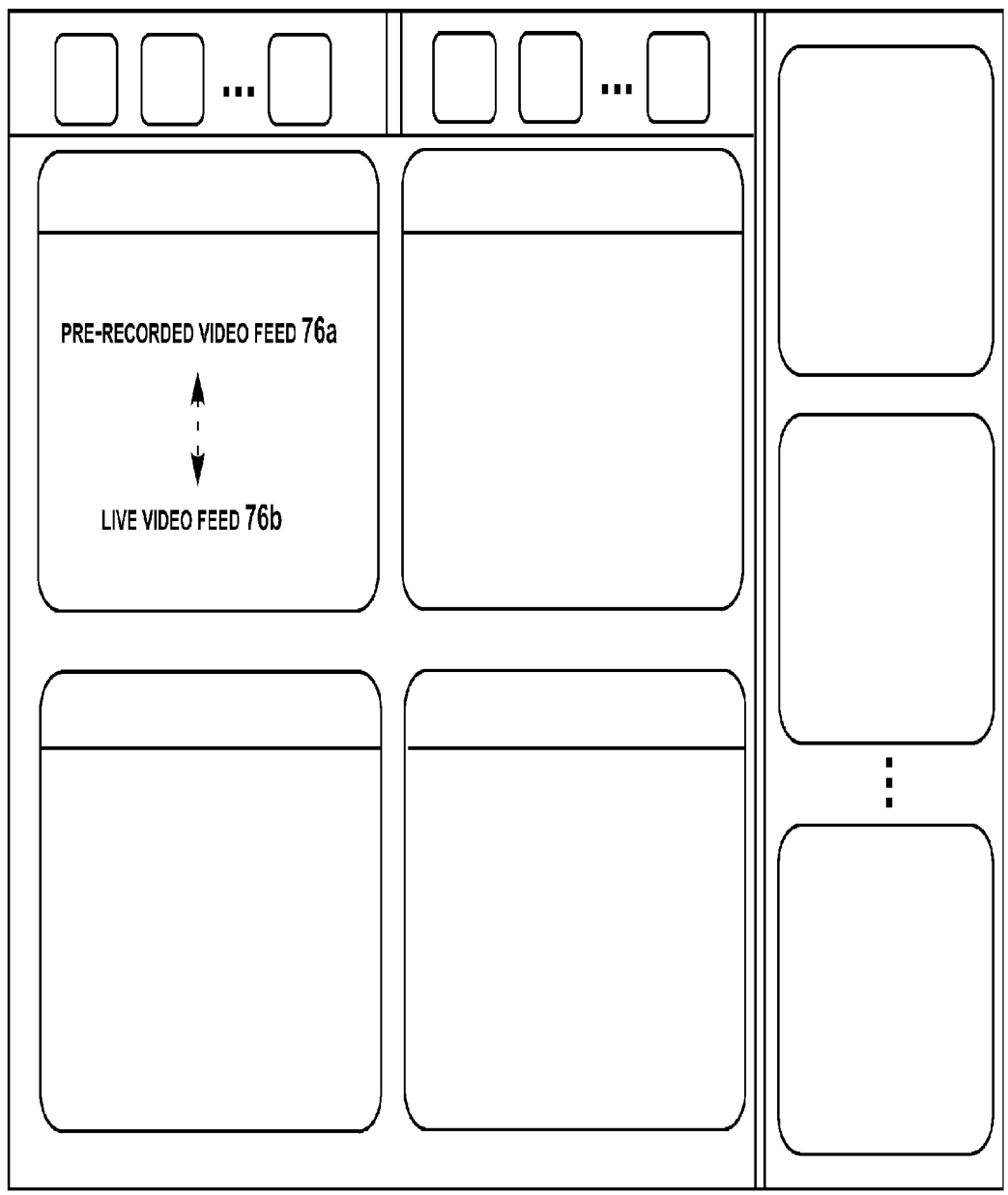
FIG. 8 is a conceptual illustration of a participant conference display in the multi-media conference system in which the content in a video content sector is switchable from a live camera feed and a pre-recorded video feed.

FIG. 8 is a conceptual illustration of a participant conference display 35 in which the content in a video content sector is switchable from a live camera feed 76a and a pre-recorded video feed 76b, which are selectively displayed in the same content sector. In general, the presenter may select among any number of live and pre-recorded video feeds that have been provisioned for use during the conference. In particular, live camera feeds may be available from each participant location and from other remote locations. Similarly, pre-recorded video feeds may be uploaded or linked to the conference server from any of the any participant computer stations and from other remote locations. Typically, the presenter has the ability to select the active video feed displayed in the upper left content sector, and this ability can be assigned to different participants as the presenter baton is passed among the participants.

Figure 9:
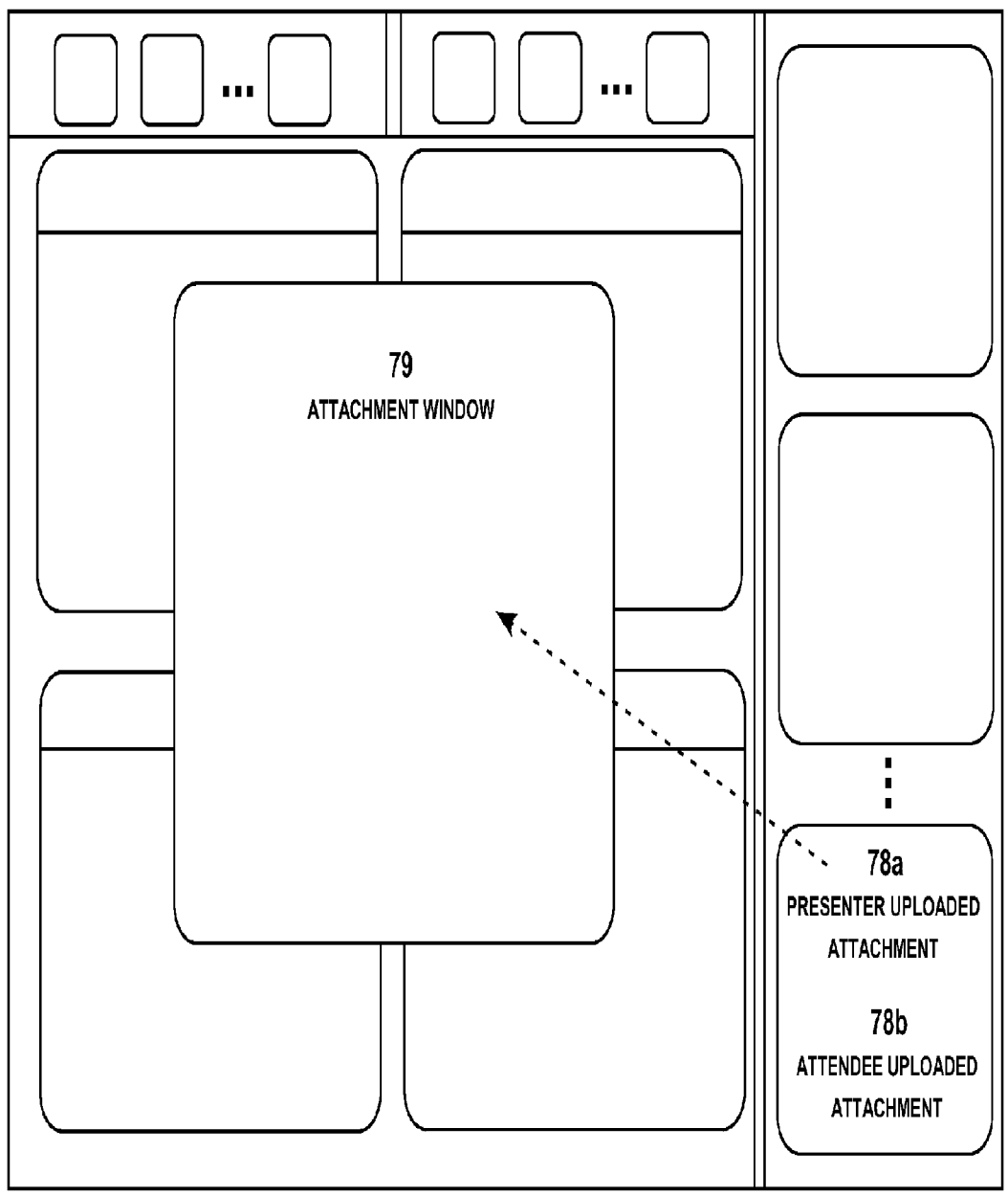
FIG. 9 is a conceptual illustration of a participant conference display showing an attachment uploaded by the presenter and an attachment uploaded a participant.

FIG. 9 is a conceptual illustration of a participant conference display 35 displaying an attachment uploaded by a participant. Links to uploaded attachments typically appear in the bottom networking pane, where any participant can select an attachment for viewing. This particular example shows a presenter uploaded attachment 78a and an attendee uploaded attachment 78b. Selecting an attachment causes an attachment window 79 to be displayed on top of the other windows in the conference display and the attachment to be displayed within the attachment window. The attachment window can then be scrolled, resized and relocated as desired. In general, each participant can open, view and control an attachment without affecting the conference display on the other participant computer stations.

Figure 10:
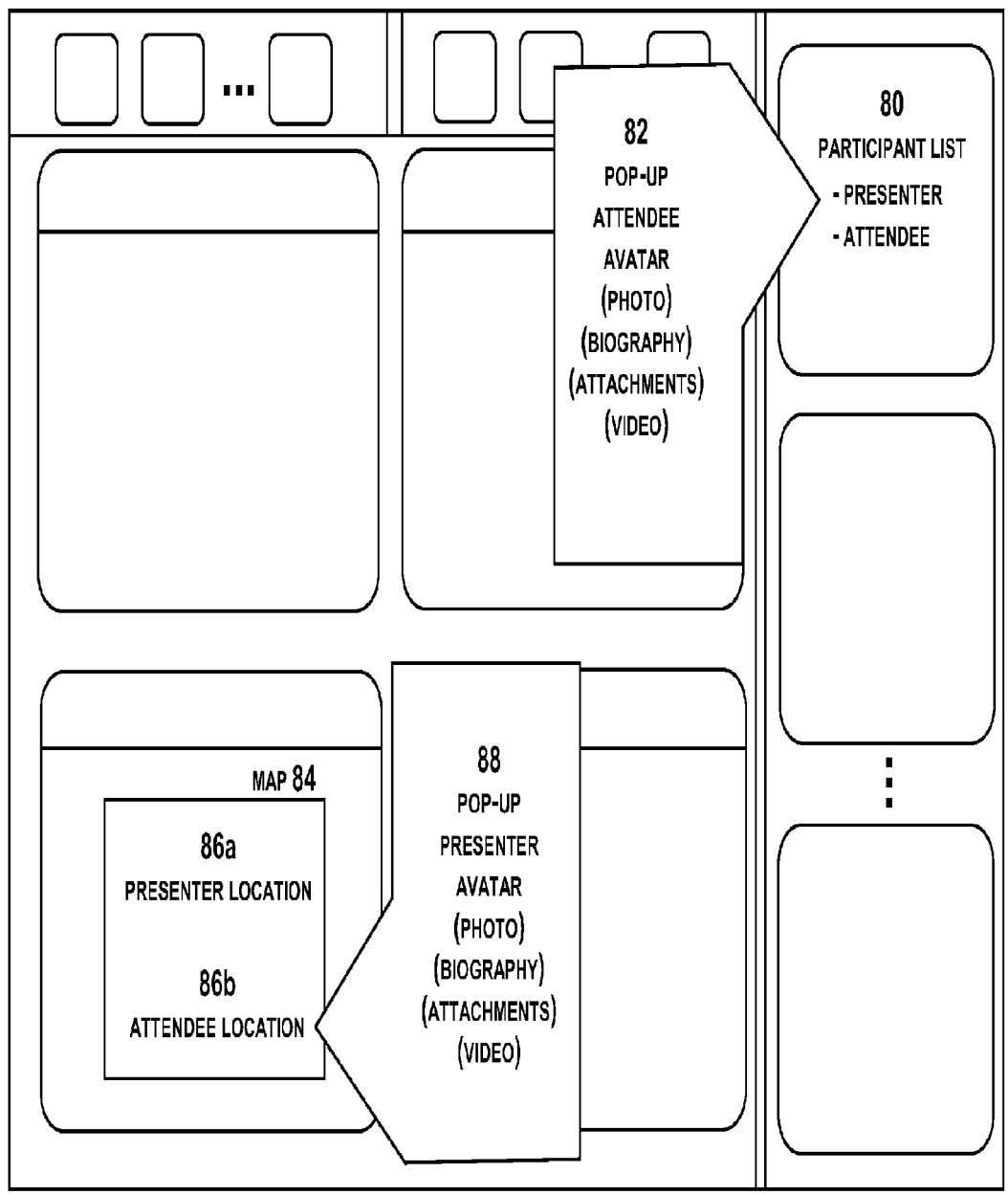
FIG. 10 is a conceptual illustration of a participant conference display in the multi-media conference system in which a content sector displays a map showing the physical locations and pop-up avatars for the meeting participants.

FIG. 10 is a conceptual illustration of a participant conference display 35 showing access to avatars entered by meeting participants. A list of meeting attendees 80 is typically displayed in the top networking pane and each meeting participant has uploaded an avatar prior to the meeting. Each avatar is linked to the associated name in the list of meeting attendees, which causes the avatar to pop up when the user hovers the cursor over the desired participant's name or otherwise selects the participant from the list. This is represented by the avatar 82, which is displayed in connection with the presenter in the participant list in FIG. 10. In addition, a geo-location function is typically displayed in the lower left content sector, which includes a geographical map 84 with location icons 86a-b showing the physical locations of the meeting participants. Again, when the when the user hovers the cursor over the desired participant's icon shown on the map, the corresponding participant's avatar pops up. This is represented by the avatar 88, which is displayed in connection with the presenter location icon 86b in the map 84.

Figure 11:
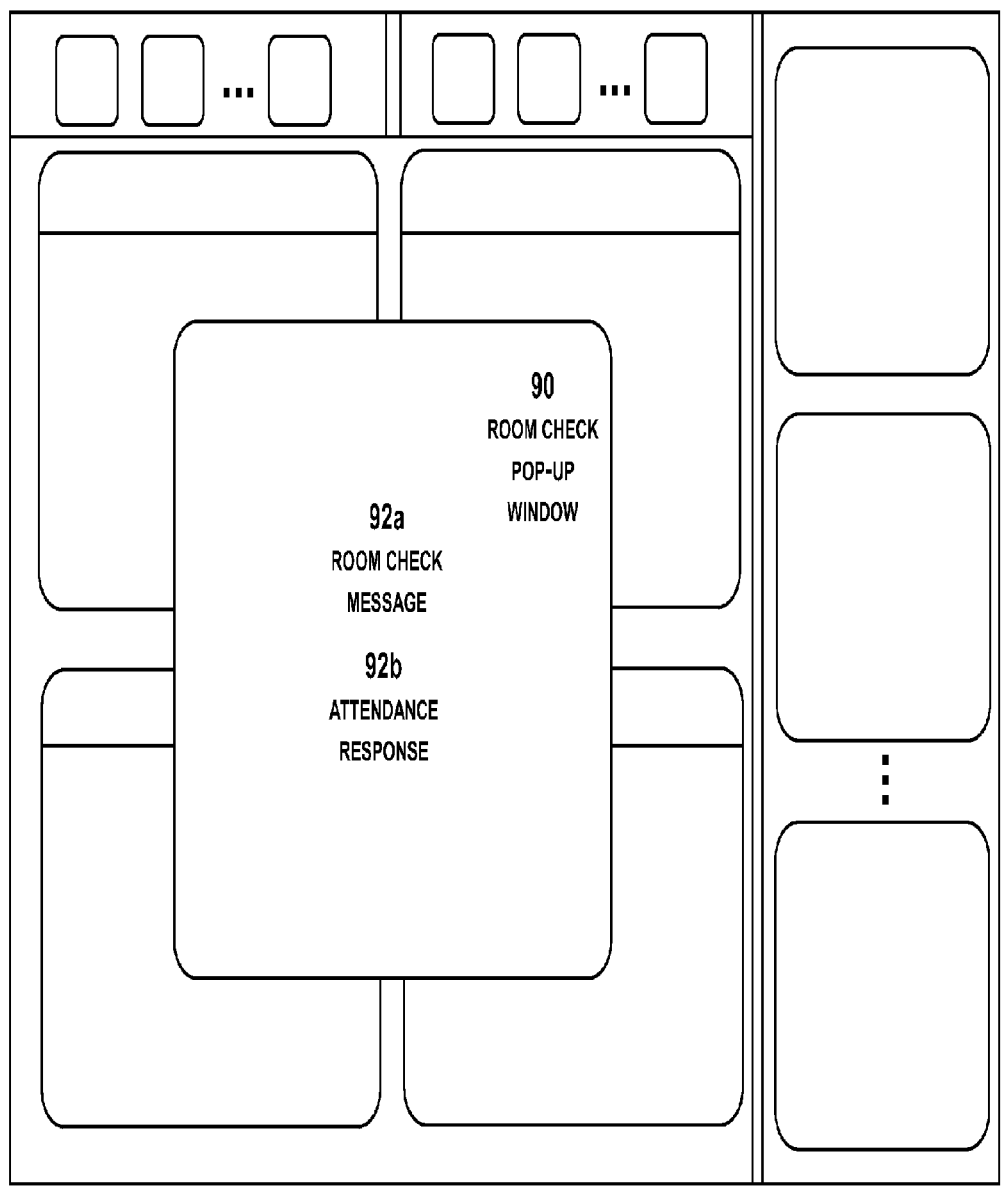
FIG. 11 is a conceptual illustration of an attendee conference display implementing a room check function in the multi-media conference system.

FIG. 11 is a conceptual illustration of an attendee conference display 37a implementing a room check function in the multi-media conference system. The room check function allows the presenter to monitor physical attendance of meeting attendees, as may be useful for testing and required meeting presentations. When the presenter issues a room check, a room-check pop-up window 90 appears as a top level window on the on the attendee conference display. The pop-up window displays a room-check message 92a, which expires after a predetermined time period. The attendee may enter an attendance response 92b within the predetermined time period, which is communicated to and recorded by the presenter computer station. If the attendee fails to enter a timely attendance response, the attendee's conference display may be automatically terminated.

Figure 12:
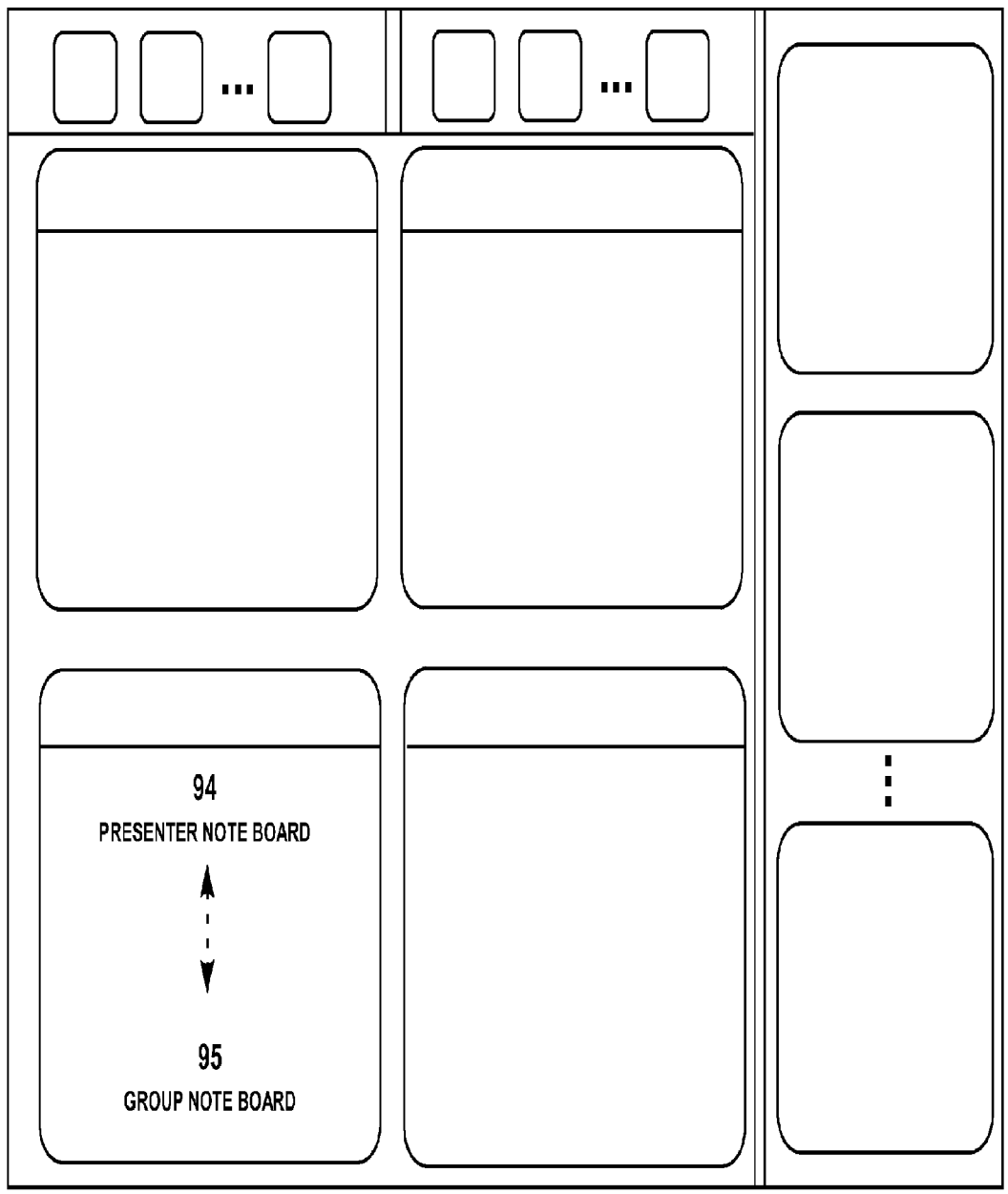
FIG. 12 is a conceptual illustration of a presenter conference display implementing a personal noteboard function and a group noteboard function in the multi-media conference system.

FIG. 12 is a conceptual illustration of a presenter conference display implementing a personal noteboard 94 and a group noteboard 95. The personal noteboard 94 allows each participant to record text notes that are not shared with other meeting participants. The group noteboard 95 allows the meeting participants to record text notes that are displayed on a common noteboard available for display on all participant computer stations. The noteboards are typically displayed in the bottom left content sector, and the participant can typically switch between the personal noteboard 94 and the group noteboard 95 with a mouse click.

Figure 13:
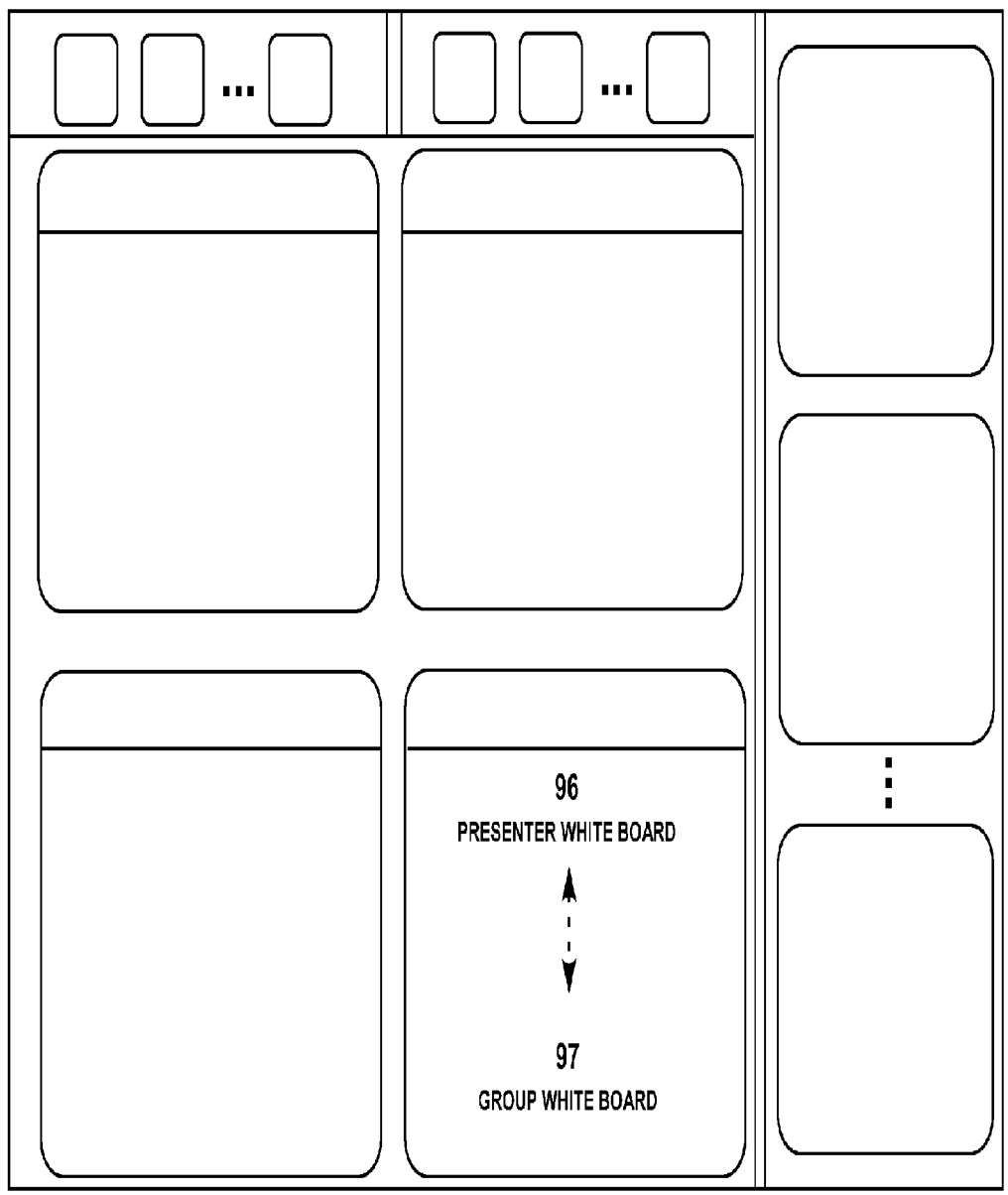
FIG. 13 is a conceptual illustration of an attendee conference display implementing a personal whiteboard function and a group whiteboard function in the multi-media conference system.

FIG. 13 is a conceptual illustration of a presenter conference display implementing a personal whiteboard 96 and a group whiteboard 97. The personal whiteboard 96 allows each participant to display images and record text notes that are not shared with other meeting participants. The group whiteboard 97 allows the meeting participants to display images and record text notes that are displayed on a common whiteboard available for display on all participant computer stations. The whiteboards are typically displayed in the bottom right content sector, and the participant can typically switch between the personal whiteboard 96 and the group whiteboard 97 with a mouse click.

Figure 14:
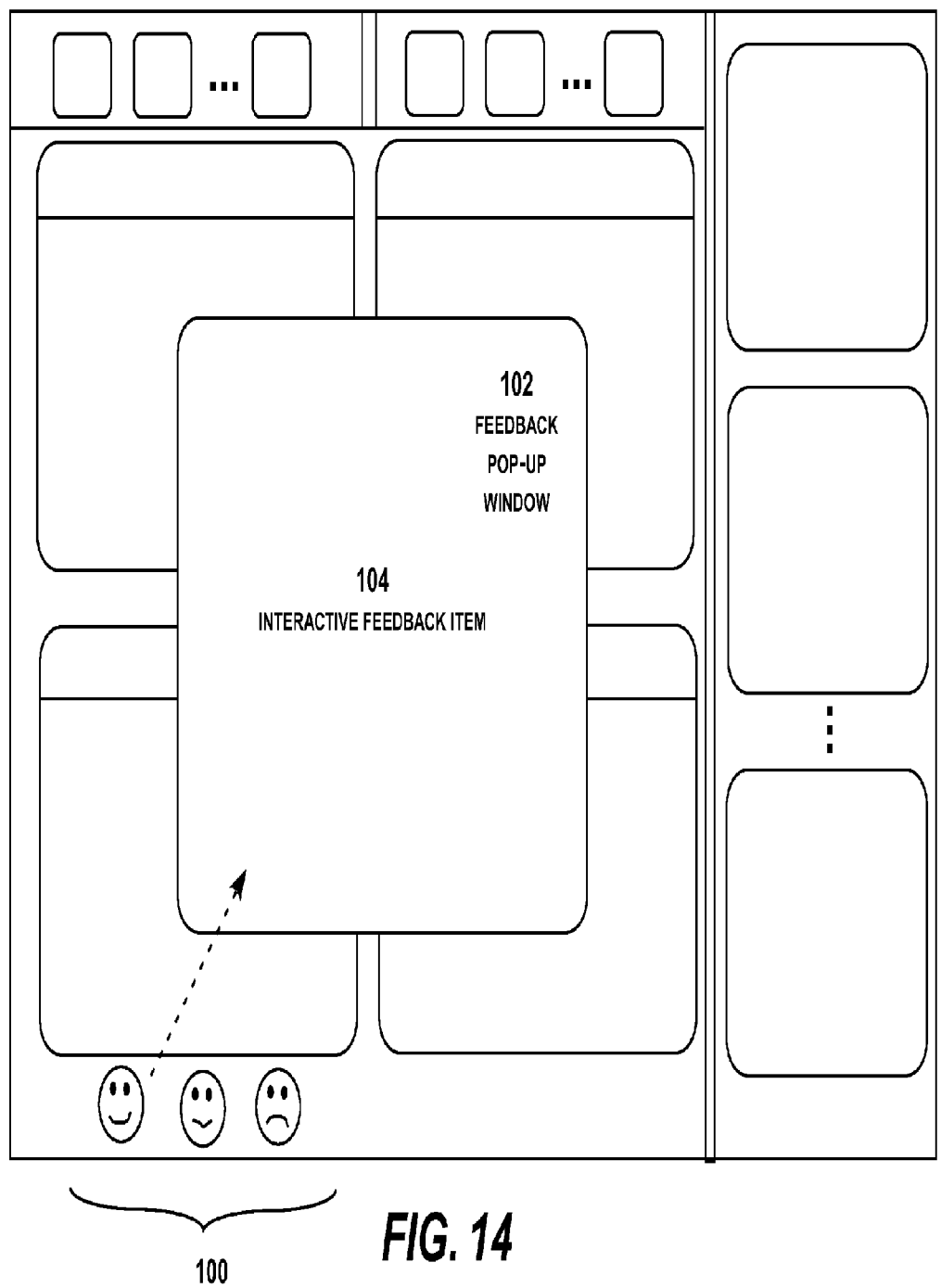
FIG. 14 is a conceptual illustration of an attendee conference display implementing an interactive feedback function.

FIG. 14 is a conceptual illustration of an attendee conference display 37a implementing interactive feedback functions. The attendee conference display shows a number of selectable "emoticons" 100 that the attendee can select to indicate his or her state of comfort with the presentation. For example, the emoticons can include a happy face icon, a concerned face icon, and an unhappy face icon. When the attendee hovers the cursor over an emoticon, the selected emoticon is shown on the presenter conference display in association with the selecting attendee's name. In addition, the attendee may click on a selected emoticon to launch a feedback window 102, in which the attendee can write a note to the presenter. The presenter may also send an interactive feedback item 104 to the attendee, which appears in the feedback window 102. For example, the interactive feedback item 104 may be a poll, survey, evaluation, quiz or timed test.

Figure 15:
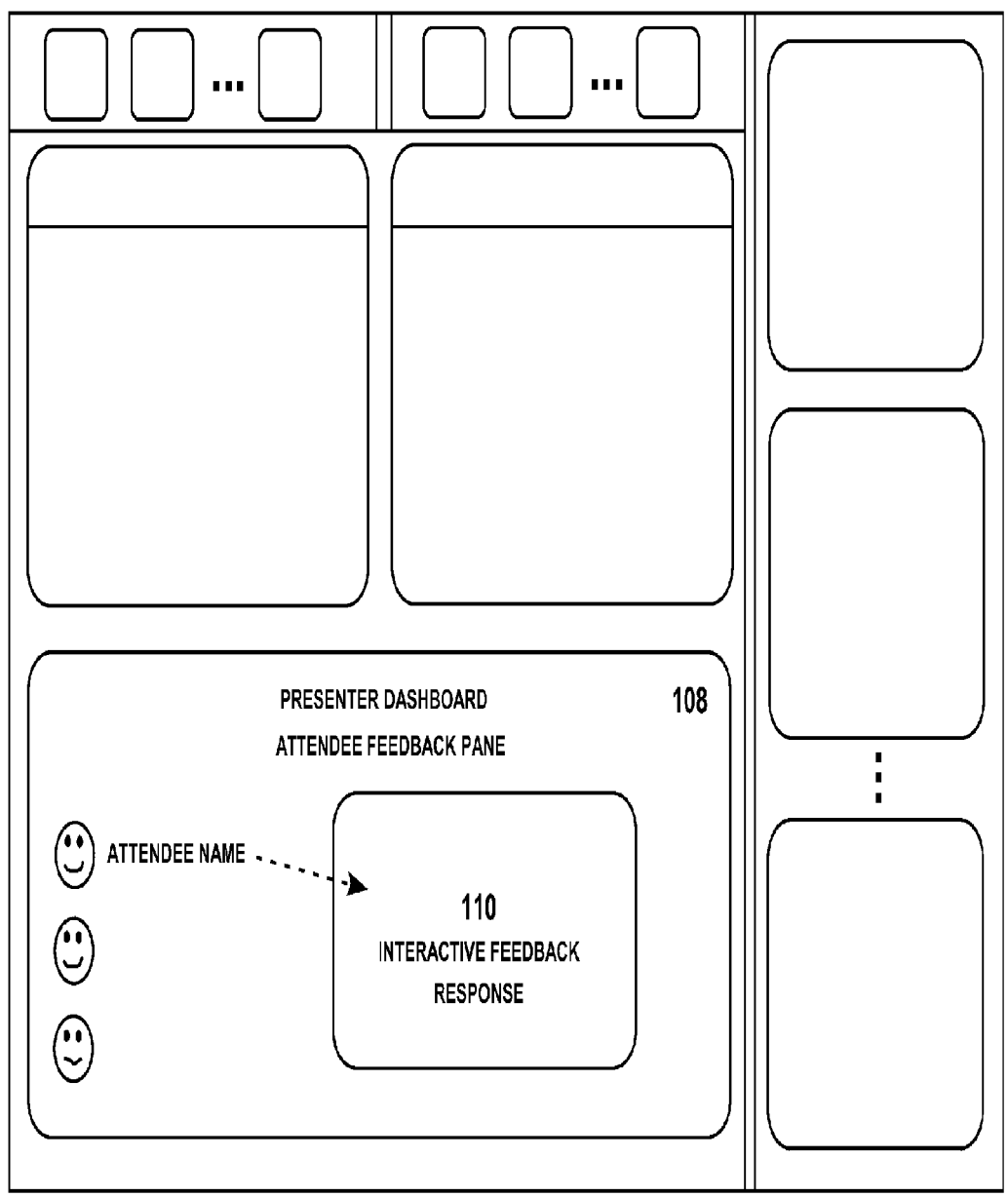
FIG. 15 is a conceptual illustration of a presenter conference display implementing the interactive feedback function.

FIG. 15 is a conceptual illustration of a presenter conference display 33 implementing the interactive feedback function in coordination with attendee conference displays. The presenter dashboard 108 displays the emoticon 100 activated by each attendee next to the attendee's name. When an attendee sends a note to the presenter, it is displayed in an interactive response window 100, which also displays responses to interactive feedback items, such as polls, evaluations, surveys, quizzes, tests, and so forth. The interactive feedback function may also tabulate and show graphical interactive feedback, such as the results to the polls, surveys, evaluations, quizzes and tests.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A multi-media conferencing system for conducting an electronic meeting for meeting participants including at least one meeting presenter and a plurality of attendees through a plurality of computer stations interconnected by a communication network, comprising:
   a conference server, coupled to the communication network and configured to receive from the presenter prior to the meeting a plurality of different conference material files, including a plurality of different types of information resources;
   a presenter computer station, coupled to the conference server via the communication network, configured to present a presenter conference display;
   a plurality of attendee computer stations, each coupled to the conference server via the communication network, configured to present an attendee conference display;
   a reporting system configured to maintain a record of the meeting, in which the record of the meeting includes: an identity of each meeting participant, a length of the meeting,
   means for presenting on a presenter display a map showing a physical location of each of the participants;
   means for receiving an indication from the presenter that allows the attendees to access at least one information resource during a presenter-defined portion of the meeting:
   means for presenting at least one quiz on each attendee conference display, receiving responses from each attendee to the quiz and displaying results of the quiz on the presenter display in real time; and
   means for presenting on each attendee conference display an item requiring a response from the attendee within a predetermined time and disconnecting any attendee from the meeting who fails to generate the response within the predetermined time,
   each attendee conference display including at least a first presenter-controlled sector, a second presenter-controlled sector and an attendee-controlled sector,
   the first presenter-controlled sector and the second presenter-controlled sector of each of the plurality of attendee computer stations each displaying a different set of information simultaneously under control of the presenter so that identical content is presented in each presenter-controlled sector of each of the plurality of attendee computer stations simultaneously,
   each attendee computer station configured to permit a corresponding attendee individually to select content in the attendee-controlled sector selected from a plurality of different content options selected from the plurality of different conference material files and to manipulate the selected content individually.

2. The multi-media conferencing system of claim 1, further comprising a conference recorder, coupled to the conference server, that is configured to record the meeting so as to record each of the information resources displayed during the meeting on a central server and to allow play back of the meeting after conclusion of the meeting.

3. The multi-media conferencing system of claim 1, further comprising:
   a. means for presenting a whiteboard on each attendee conference display; and
   b. means for screen casting electronic information on the whiteboard, the electronic information including information selected from a group consisting of: a photograph, a video, an audio clip, a text document, and combinations thereof.

4. The multi-media conferencing system of claim 1, wherein the reporting system records information including: the name of each of the attendees, how long they are in a meeting, how many times they leave the meeting, when they come & go, all activities done during the session, performance and test results both after the fact and in real time.

5. The multi-media conferencing system of claim 1, further comprising means for assigning at least two subsets of the plurality of attendee computer stations to a corresponding plurality of breakout sessions, in which attendees assigned to one breakout session can interact only other attendees to that one breakout session.

6. The multi-media conferencing system of claim 5, further comprising means for ending the plurality of breakouts sessions at the end of a predetermined amount of time.

7. The multi-media conferencing system of claim 5, further comprising means for ending the plurality of breakouts sessions in response to a input from the presenter computer station.

8. The multi-media conferencing system of claim 5, further comprising means for recording activity occurring during each of the plurality of breakout sessions.

9. The multi-media conferencing system of claim 1, wherein at least one of the first presenter-controlled sector and the second presenter-controlled sector displays a real time video stream.

10. The multi-media conferencing system of claim 1, wherein the plurality of different types of information resources are selected from a group of information resources consisting of: three dimensional models, text documents, graphical images, photos, spreadsheets and combinations thereof.

11. The multi-media conferencing system of claim 1, wherein each attendee conference display further includes a second attendee-controlled sector.

12. A method of conducting an electronic meeting for a plurality of meeting participants including at least one meeting presenter and a plurality of attendees through a plurality of computer stations interconnected by a communication network, comprising the steps of:
   uploading to a conference server that is coupled to the communication network a plurality of different conference material files, including a plurality of different types of information resources, prior to the electronic meeting;
   displaying an attendee conference display on each of a plurality of attendee computer stations so that each attendee conference display includes at least a first presenter-controlled sector and a second presenter-controlled sector;

displaying in two presenter-controlled sectors of each of a plurality of attendee computer stations at least two different sets of information simultaneously under control of the presenter so that identical content is presented in each presenter-controlled sector of each of the plurality of attendee computer stations simultaneously;

displaying in an attendee-controlled sector of each of a plurality of attendee computer stations content selected by an attendee;

permitting each attendee individually to select content in the attendee-controlled sector selected from a plurality of different content options and to manipulate the selected content individually, so that each attendee views content in the attendee-controlled sector independently of each other attendee;

presenting on a presenter display a map showing a physical location of each of the participants;

recording the meeting so as to record each of the information resources displayed during the meeting so as to allow play back of the meeting by one of the attendees after conclusion of the meeting;

receiving an indication from the presenter that allows the attendees to access at least one information resource during a presenter-defined portion of the meeting;

presenting at least one quiz on each attendee conference display, receiving responses from each attendee to the quiz and displaying results of the quiz on the presenter display in real time;

presenting on each attendee conference display an item requiring a response from the attendee within a predetermined time and disconnecting any attendee from the meeting who fails to generate the response within the predetermined time; and maintaining a log indicating activity of each attendee, including: the name of each of the attendees, how long they are in a meeting, how many times they leave the meeting, when they come & go, all activities done during the session, performance and test results both after the fact and in real time.

13. The method of claim 12, further comprising the steps of
a. presenting a whiteboard on each attendee conference display; and
b. screen casting electronic information on the whiteboard, the electronic information including information selected from a group consisting of: a photograph, a video, an audio clip, a text document, and combinations thereof.

14. The method of claim 12, further comprising the step of assigning at least two subsets of the plurality of attendee computer stations to a corresponding plurality of breakout sessions, in which attendees assigned to one breakout session can interact only other attendees to that one breakout session.

15. The method of claim 12, further comprising the step of ending the plurality of breakouts sessions at the end of a predetermined amount of time.

16. The method of claim 12, further comprising the step of ending the plurality of breakouts sessions in response to a input from the presenter computer station.

17. The method of claim 12, further comprising the step of recording activity occurring during each of the plurality of breakout sessions.

18. The method of claim 12, wherein at least one of the first presenter-controlled sector and the second presenter-controlled sector displays a real time video stream.

19. The method of claim 12, wherein the plurality of different types of information resources are selected from a group of information resources consisting of: three dimensional models, text documents, graphical images, photos, spreadsheets and combinations thereof.

20. The method of claim 12, wherein each attendee conference display further includes a second attendee-controlled sector.

* * * * *